United States Patent
Herloski

(10) Patent No.: US 10,768,497 B2
(45) Date of Patent: Sep. 8, 2020

(54) HYPERSPECTRAL IMAGING SYSTEM

(71) Applicant: Xerox Corporation, Norwalk, CT (US)

(72) Inventor: Robert P. Herloski, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/283,765

(22) Filed: Oct. 3, 2016

(65) Prior Publication Data

US 2018/0095307 A1 Apr. 5, 2018

(51) Int. Cl.
*G02F 1/137* (2006.01)
*G03G 15/00* (2006.01)

(52) U.S. Cl.
CPC ......... *G02F 1/137* (2013.01); *G03G 15/5041* (2013.01); *G03G 15/5062* (2013.01); *G02F 2202/022* (2013.01); *G02F 2203/12* (2013.01)

(58) Field of Classification Search
CPC ................................ H04N 5/33; H04N 5/369
USPC ..................................................... 348/33, 164
See application file for complete search history.

(56) References Cited

U.S. PATENT DOCUMENTS

| | | | |
|---|---|---|---|
| 5,619,266 A | 4/1997 | Tomita | |
| 6,169,594 B1 | 1/2001 | Aye | |
| 6,421,131 B1 * | 7/2002 | Miller | G01J 3/447 356/453 |
| 6,975,949 B2 | 12/2005 | Mestha et al. | |
| 6,985,216 B2 * | 1/2006 | Treado | G01J 3/02 250/461.1 |
| 7,116,370 B1 | 10/2006 | Huang | |
| 7,639,363 B2 * | 12/2009 | Chao | G01J 3/2823 356/453 |
| 8,118,226 B2 * | 2/2012 | Olmstead | G06K 7/10722 235/455 |
| 8,149,405 B2 * | 4/2012 | DiCarlo | B41J 29/393 356/402 |
| 8,351,044 B2 * | 1/2013 | Matsumoto | G01J 3/02 356/454 |

(Continued)

OTHER PUBLICATIONS

Itoh et al., "Liquid-Crystal Imaging Fourier-Spectrometer Array", Department of Applied Physics, Osaka University, 1990.

(Continued)

*Primary Examiner* — Christopher S Kelley
*Assistant Examiner* — Boubacar Abdou Tchoussou
(74) *Attorney, Agent, or Firm* — Simpson & Simpson, PLLC

(57) ABSTRACT

A hyperspectral imaging system, comprising an input polarizer arranged to receive and polarize a first light, a liquid crystal variable retarder to change a polarization of the first light in a wavelength-dependent manner, an output polarizer arranged to receive the wavelength-dependent polarized first light, a voltage source electrically connected to the liquid crystal variable retarder, a controller connected to the voltage source, the controller configured to control voltages applied to the liquid crystal variable retarder to control a retardance of the first light. A linear image sensor has a length extending in a direction to obtain images of the first light, the linear image sensor synchronized with the controller to collect the images as a function of retardance of the liquid crystal variable retarder after the first light passes through the output polarizer, for generation of an output signal corresponding to a portion of the linear image sensor.

22 Claims, 21 Drawing Sheets

(56) References Cited

U.S. PATENT DOCUMENTS

| | | | | |
|---|---|---|---|---|
| 8,406,859 | B2* | 3/2013 | Zuzak | A61B 5/0071 257/440 |
| 8,422,017 | B2* | 4/2013 | Gottwals | B41F 33/0036 356/402 |
| 8,800,874 | B2* | 8/2014 | Gao | G06K 7/10722 235/454 |
| 9,095,291 | B2* | 8/2015 | Soller | A61B 5/14552 |
| 9,256,013 | B2* | 2/2016 | Shi | G01J 3/2823 |
| 9,330,464 | B1* | 5/2016 | Ackerman | G01S 17/89 |
| 9,696,674 | B2* | 7/2017 | Ishii | G03G 15/5062 |
| 2003/0076434 | A1* | 4/2003 | Karasawa | H04N 1/1903 348/311 |
| 2004/0165101 | A1 | 8/2004 | Miyanari | |
| 2005/0041244 | A1* | 2/2005 | Treado | G01J 3/02 356/301 |
| 2005/0190329 | A1 | 9/2005 | Okumura | |
| 2006/0279732 | A1 | 12/2006 | Wang | |
| 2007/0003263 | A1 | 1/2007 | Nomura | |
| 2008/0212874 | A1 | 9/2008 | Stelb | |
| 2008/0278593 | A1 | 11/2008 | Cho | |
| 2010/0056928 | A1* | 3/2010 | Zuzak | A61B 5/0071 600/476 |
| 2010/0250182 | A1* | 9/2010 | Matsumoto | G01J 3/02 702/106 |
| 2010/0317919 | A1* | 12/2010 | Takaoka | A61B 1/00057 600/104 |
| 2012/0147390 | A1* | 6/2012 | Elliot | H04N 1/6047 358/1.9 |
| 2012/0300143 | A1 | 11/2012 | Viogt | |
| 2013/0027516 | A1 | 1/2013 | Hart | |
| 2013/0107260 | A1* | 5/2013 | Nozawa | G01J 3/42 356/402 |
| 2014/0098309 | A1* | 4/2014 | Shi | G01J 3/2823 349/18 |
| 2014/0354868 | A1 | 12/2014 | Desmarais | |
| 2015/0206912 | A1 | 7/2015 | Kanamori | |
| 2015/0261163 | A1* | 9/2015 | Ishii | G03G 15/5025 250/559.16 |
| 2016/0123811 | A1 | 5/2016 | Hegyi et al. | |
| 2016/0127660 | A1 | 5/2016 | Hegyi et al. | |
| 2016/0127661 | A1 | 5/2016 | Hegyi et al. | |
| 2016/0147001 | A1 | 5/2016 | Herloski | |

OTHER PUBLICATIONS

Takeda et al., "Fourier-transform method of fringe-pattern analysis for computer-based topography and interferometry," J. Opt. Soc. Am 72,156-160 (1982).

Ren et al., "Anisotropic Liquid Crystal Gels for Switchable Polarizers and Displays," Appl. Phys. Lett. 81, 1432-1434 (2002).

Hegyi, Alex; Martini, Joerg; "Hyperspectral Imaging With a Liquid Crystal Polarization Interferometer"; Optics Express, published Oct. 26, 2015; pp. are 28,742-28,754; vol. 23, No. 22; Publisher—Optical Society of America.

* cited by examiner

HYPERSPECTRAL IMAGING SYSTEM

TECHNICAL FIELD

Hyperspectral imaging systems for use with printers.

BACKGROUND

Color printers in which primary-color images are accumulated on a photoreceptor and transferred to an output sheet as a full-color image are known.

Color printers commonly have a control system including monitors which can make measurements of images created on the photoreceptor or of images which were transferred to an output sheet. These monitors are typically in the form of optical densitometers. The information gathered therefrom is used by the control system to modify printer outputs to the photoreceptor or output sheet in various ways to aid in the operation of the printer. These effects can occur in a real-time feedback loop, an offline calibration process or a registration system.

Typically, a printer using a control system which relies on a monitor requires the deliberate creation of what shall be herein called "test patches". Test patches are made and subsequently measured in various ways by the monitors. These test patches are images of a desired darkness value, a desired color blend, and/or a particular shape, such as a line pattern; or they may be of a shape particularly useful for determining registration of superimposed images ("fiducial" or "registration" marks).

Conventional densitometers are limited in the amount of information they can generate due, in part, to limitations in the space over which they gather information and limitation in the portion of the spectrum over which the information is gathered.

SUMMARY

Hyperspectral imaging (HSI) includes collecting and processing information from across the UV, visible, and/or infrared portions of the electromagnetic spectrum. A hyperspectral imager images a band of spectral information at locations in a scene. HSI is frequently employed to increase the depth of information from a scene. Well-known applications of HSI abound for domains as diverse as industrial and agricultural sorting, remote sensing for agriculture and defense, threat identification, and even medicine.

Techniques for generating hyperspectral images are described in U.S. patent application Ser. No. 14/883,404 filed Oct. 14, 2015, 14/527,347 filed Oct. 29, 2014 and Ser. No. 14/527,378 filed Oct. 29, 2014 the substance of said applications is hereby incorporated by reference herein, in their entireties. According to some of the techniques, a hyperspectral imaging measurement system comprises a detector including a two-dimensional image sensor that is used to gather sequential images of a scene. The measurement system is configured such that, in each of the sequential images, a given pixel (or sensor area) in the image sensor gathers different spectral information from a given portion of the scene. After the images are gathered, hyperspectral information for each pixel (or sensor area) is attained from the series of images by performing a Fourier transform on the information. According to said techniques, the imager and scene remain still or relative motion between the imager and the scene is compensated for such that a transform process provides spectral information from the given pixels and the corresponding portion of the scene.

According to aspects of the present disclosure, the information gathering techniques described above are modified to facilitate gathering hyperspectral information with a printer monitor for a moving scene (such as a test patch on image bearing surface) using a linear sensor array.

An aspect of the disclosure is directed to a hyperspectral imaging (HSI) system for use with a printer. The image system comprises an input polarizer arranged to receive and polarize a first light (which is input into the imaging system), a liquid crystal variable retarder arranged after the input polarizer along the path of the first light to change a polarization of the first light in a wavelength-dependent manner, and an output polarizer arranged to receive the wavelength-dependent polarized first light and to convert polarization state information of the first light into a form detectable as light intensity. A voltage source electrically is connected to the liquid crystal variable retarder, and a controller is connected to the voltage source. The controller is configured to control voltages applied to the liquid crystal variable retarder to control a retardance of the first light. The imaging system further comprises a linear image sensor having a length extending in a direction to obtain images of the first light, and the linear image sensor is synchronized with the controller to collect the images as a function of retardance of the liquid crystal variable retarder after the first light passes through the output polarizer. The sensor generates an output signal corresponding to a portion of the linear image sensor.

Another aspect of the disclosure is directed to a printer, comprising a light source, and an image bearing surface positioned to receive light form the light source and to form an output light from the light incident thereon, the image bearing surface disposed on a drum or a belt to move the image bearing surface in a process direction. The printer further comprises a HSI system as described with reference to the first aspect of the disclosure. The printer further comprises a linear image sensor having a length extending in a direction to obtain images of the output light in the cross-process direction. The linear image sensor is synchronized with the controller to collect the images as a function of retardance of the liquid crystal variable retarder after the output light passes through the output polarizer for generation of an output signal corresponding to a portion of the linear image sensor. The printer further comprises a processor to perform transformations of the output signal to obtain spectral information.

The following discussion uses several terms having the following definitions. A "liquid crystal variable retarder" or "liquid crystal variable retarder device" refers to at least one liquid crystal (LC) cell, comprising liquid crystal material sandwiched between two transparent, typically glass, substrates. Transparent electrode layers deposited on the glass substrates, typically made of a transparent conductor such as indium tin oxide or ITO, provide for the generation of an electric field within the liquid crystal cell, which is used to vary the orientation of the liquid crystal molecules and hence the optical retardance of the liquid crystal variable retarder. Additional layers may be provided interior to the cell, such as polyimide alignment layers deposited on the electrode layer that are rubbed in a preferred alignment direction to orient the liquid crystal molecules. Instead of a single LC cell comprising the liquid crystal variable retarder, there may be several.

A "hyperspectral imaging system" or "HSI system" refers to a combination of the optics, a linear sensor, and a processor. The processor may reside in a stand-alone device, meaning a device that contains all of the elements of the system including the processor and the image sensor, and functions independently of a host. Alternatively, the processor and/or the image sensor may be components of a host system, with all of the associated combinations. A "host system" or "host" is an optional device that sends HSI parameters to an HSI system and receives HSI data in return. An example of a device that is a host system having an HSI component (LC variable retarder, retardance controller and voltage source) is shown in FIG. 2.

A "printer" refers to any type of printing device including, for example, a laser printer and a copier.

BRIEF DESCRIPTION OF THE SEVERAL VIEWS OF THE DRAWING

The nature and mode of operation of the present disclosure will now be more fully described in the following detailed description taken with the accompanying drawing figures, in which.

DETAILED DESCRIPTION

Figure 1:
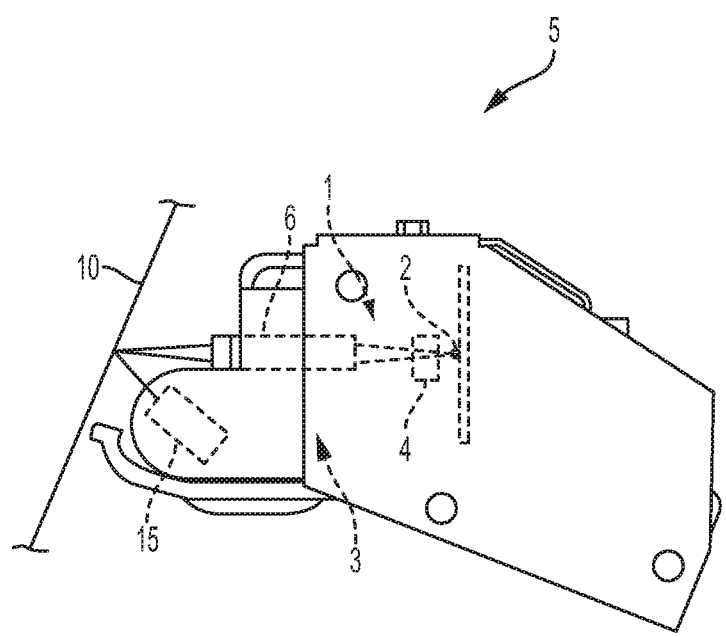
FIG. 1 is a schematic illustration of an example of a monitor of a printer comprising a hyperspectral imaging system according to aspects of the present disclosure.

FIG. 1 is a schematic illustration of an example of an embodiment of a portion of a printer including a monitor having hyperspectral imaging (HSI) capabilities according to aspects of the present disclosure. The monitor can be arranged to obtain spectral information from an image on an image bearing surface 10. The monitor includes a light source 15 (e.g., LED array or rare gas lamp) and a detector module 1. Detector module 1 comprises optics 3 including lens array 6, filter 4 and possibly other optical elements, and a linear sensor array 2.

It will be appreciated that the printer is configured with the image bearing surface on a drum or photoreceptor belt 13 (shown in FIG. 2) driven by a motor (not shown) which causes the image bearing surface to move in a process direction, in a conventional manner to generate print images. According to aspects of the disclosure, the monitor is arranged such that the image bearing surface moves past the monitor to allow data gathering from an image (e.g., a test patch) as described herein. The location of the monitor is determined in-part by the space available in the printer.

Optics 3 include a lens array 6 that is interposed between the image bearing surface 10, a filter 4 to filter light received from the image bearing surface 10 to produce a spectrally time-varying signal as discussed below. The lens array may comprise, for example, a Selfoc® lens or other micro lens arrangement with a predetermined acceptance angle β. A Selfoc® lens is a gradient index lens which consists of fiber rods with parabolic index profiles.

Light from the optics is detected by linear sensor array 2. In some embodiments, linear sensor array 2 is, for example, a full width array (FWA) sensor. A full width array sensor is defined as a sensor that extends substantially an entire width (perpendicular to the process direction) of the moving image bearing surface. The full width array sensor may include a plurality of sensors equally spaced at intervals (e.g., every 1/600th inch (600 spots per inch)) in the cross-process (or fast scan) direction (see for example, U.S. Pat. No. 6,975,949, which is hereby incorporated by reference herein). It is understood that other linear array sensors may also be used, such as contact image sensors, CMOS array sensors or CCD array sensors. It is to be appreciated a linear sensor can be comprised of a one-dimensional array of sensors aligned perpendicular to the direction of motion or can be comprised of a two-dimensional array of sensors where the sensors extending in a direction parallel to the direction of motion are binned together to provide a single output. The linear sensor and the light source are aligned so that their lengths extend in the cross-process direction.

Figure 2:
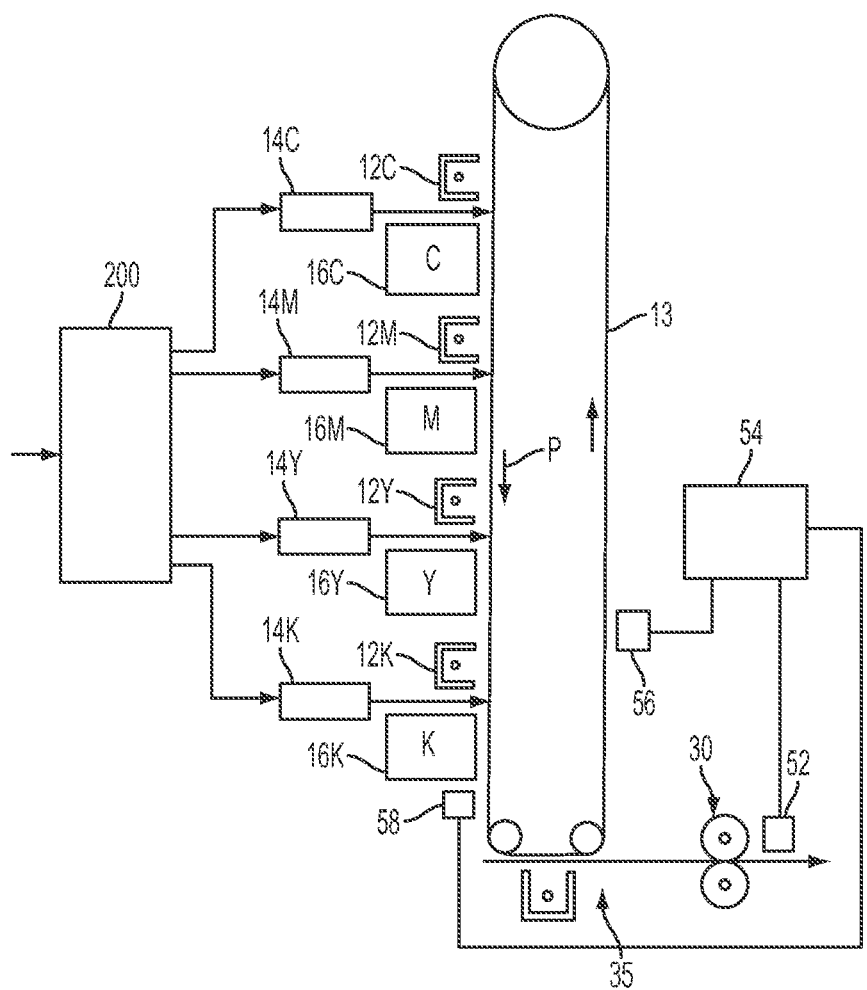
FIG. 2 is a simplified, schematic illustration of basic elements an example of a xerographic color printer including a monitor comprising a hyperspectral imaging system according to aspects of the present disclosure.

FIG. 2 is a simplified schematic view of basic elements of a color printer, comprising one or more monitors 52, 56, and 58, each comprising an HSI measurement capabilities according to the present disclosure. Specifically, there is shown an "image-on-image" xerographic color printer, in which successive primary-color images are accumulated on a photoreceptor belt 13, and the accumulated superimposed images are in one step directly transferred to an output sheet as a full-color image. In one implementation, the Xerox Corporation iGen5® digital printing press may be utilized. However, it is appreciated that any printing machine, such as monochrome machines using any technology, machines which print on photosensitive substrates, xerographic machines with multiple photoreceptors, or ink-jet-based machines, can beneficially utilize the present disclosure as well.

Specifically, the embodiment illustrated in FIG. 2 includes a photoreceptor belt 13 having an image bearing surface, along which are disposed a series of print stations, as is generally familiar in the art of xerography, one set for each primary color to be printed. For instance, to place a cyan color separation image on photoreceptor 13, there is used a charge corotron 12C, an imaging laser 14C, and a development unit 16C. For successive color separations, there is provided equivalent elements 12M, 14M, 16M (for magenta), 12Y, 14Y, 16Y (for yellow), and 12K, 14K, 16K (for black). The successive color separations are built up in a superimposed manner on the surface of photoreceptor 13, and then the combined full-color image is transferred at transfer station 35 to an output sheet (not shown). The output sheet is then run through a fuser 30, as is familiar in xerography. Operation of the printer to form an image is controlled by a host processor 200.

Also shown in the FIG. 2, monitors, such as monitors 56, 52, and 58 are arranged to provide feedback to a control device 54 (e.g., a processor). The monitors such as 56, 52, and 58 are devices which can make measurements of images created on the photoreceptor 13 (such as monitor 56 and 58) or to images which were transferred to an output sheet (such as monitor 52). One or more of these monitors can, for example, can be configured to have HSI measurement capabilities according to aspects of the present disclosure. There may be provided any number of monitors, and they may be placed anywhere in the printer as needed, not only in the locations illustrated. The information gathered therefrom is used by control device 54 in various ways to aid in the operation of the printer, whether in a real-time feedback loop, an offline calibration process, a registration system, etc. It is to be appreciated that control device 54 may be a partition of the host processor 200 of the printer, a dedicated processor, etc. No limitation is intended, nor should any be implied, as to a particular arrangement of the processors in the overall system Typically, a printer using control systems which rely on monitors such as 56, 52, and 58 require the deliberate creation of test patches which are printed and subsequently measured in various ways by one or another monitor. Various image-quality systems, at various times, will require test marks of specific types to be placed on photoreceptor 13 at specific locations. These test marks will be made on photoreceptor 13 by one or more lasers such as 14C, 14M, 14Y, and 14K. Printing of test patches may be controlled, for example, by host processor 200.

According to aspects of the present disclosure, a calibration procedure can be performed so that the signals from the linear sensor array 2 can be used to determine spectral characteristics of images being printed in a manner as described below.

As is familiar in the art of "laser printing," by coordinating the modulation of the various lasers with the motion of photoreceptor 13 and other hardware (such as rotating mirrors, etc., not shown), the lasers discharge onto photoreceptor 13 to create the desired test marks, particularly after these areas are developed by their respective development units 16C, 16M, 16Y, 16K. The test marks are placed on the photoreceptor 13 in locations where they can be subsequently measured by a (typically fixed) monitor elsewhere in the printer, for whatever purpose. In some embodiments, a monitor as described above can be placed just before or just after the transfer station 35 where the toner is transferred from the photosensor to the output sheet.

For example, HSI measurement systems having spectral filtering as described in co-pending U.S. patent application Ser. No. 14/883,404 filed Oct. 14, 2015 titled LIQUID CRYSTAL FOURIER TRANSFORM IMAGING SPECTROMETER (which was incorporated by reference above) may be used in a monitor according to aspects of the present disclosure.

Figure 3:
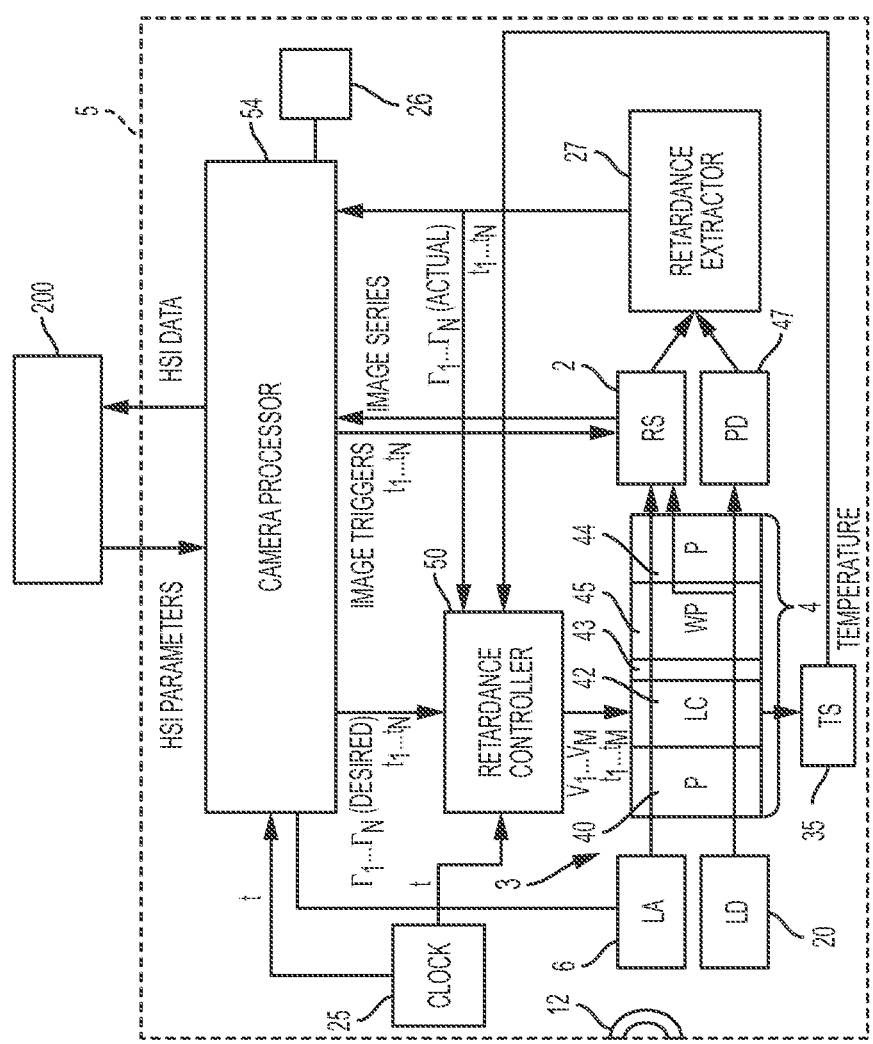
FIG. 3 shows a schematic of an example of a monitor comprising a hyperspectral imaging system.

FIG. 3 shows an internal schematic of a device such as monitor 5 having HSI measurement capabilities (also referred to herein as an HSI imager or HSI measurement system). The device may be in communication with a host device such as a printer as describe herein. This is merely an example of one such device. The light enters the device through the aperture 12, enters optics 3 where it passes through lens array 6, filter 4, and then propagates to linear detector 2. Whatever the operating principle of the detector, the detector converts the received light into a voltage signal that can be processed by the processor 54 as described in the above-identified co-pending patent application. The device may also include memory 26. Memory 26 may store instructions to operate processor 54, including instructions that come in the form of applications, control and configuration information for the processor to manipulate the optics, and data generated by monitor 5. Two or more monitors, may share a processor 54. Clock 25 coordinates the processor 54 and retardance controller 50 such that frames are gathered at a known time.

The optics 3 may include a relay lens or other relay optical device as will be discussed in more detail later. The optics include a lens array 6 and filter 4 as described above. Typically, imaging lenses are fixed relative to the image sensor or detector. Other optical elements may be included in the optics or elsewhere in the system, such as a chromatic compensation device.

The filter 4 comprises a liquid crystal variable retarder 42 placed between optical polarizers 40, 44. After passing through the lens array 6, the light travels through input polarizer 40, the liquid crystal variable retarder 42, an optional compensation layer 43, an optional waveplate 45, and output polarizer 44. The light then strikes the linear sensor 2. In certain embodiments, the optical axis of the variable retarder is nominally at 45 degrees with respect to the polarizers. For a given wavelength of incident light that passes through the first polarizer, the system oscillates between transmitting and not transmitting the light as the optical retardation increases. This oscillation occurs because the retarder periodically alters the polarization state of the light as the retardance increases, and the output polarizer functions to alternately block or pass the light after the retarder based on its polarization state. Retardance may be described as optical path delay or optical phase delay, as discussed below, where optical phase delay is proportional to the optical path delay divided by the wavelength. For example, in a given filter, input polarizer 40 may be a linear polarizer adapted to polarize a light input in a first direction, and output polarizer 44 is a polarizer to polarize the light input in a direction, orthogonal to the first direction. In another example, polarizer 40 may be a circular polarizer to polarize a light input in a first direction (e.g., a right circular polarization) and polarizer 44 is a polarizer to polarize the light input in a direction opposite to the first direction (e.g., a left circular polarizer).

The intensity oscillations as a function of optical retardance, collectively called the interferogram, occur with a period that depends on the incident wavelength. Each unique incident wavelength oscillates in intensity as a function of retardance at a different rate, and the intensity oscillations from a combination of incident wavelengths sum together linearly.

Another element of the HSI imager may consist of a retardance or phase compensation layer or compensator 43. Such a compensation layer applies a static phase delay at each point in an image, enabling sampling of a different portion of the interferogram than would normally be sampled by applying a voltage waveform to the liquid crystal device. One embodiment of such a compensation layer would achieve net zero retardance in combination with the liquid crystal device when the HSI abilities are inactive; this may prevent the HSI aspects from interfering with the normal non-hyperspectral operation of the monitor in a non-hyperspectral manner.

The light may take a second path to a photodetector 47. In some embodiments, the resulting detection signals are extracted by a retardance extractor 27 and sent to the processor 54 and the retardance controller 50. The retardance extractor can extract the retardance of the liquid crystal variable retarder from signals generated by the photodetector 47, or linear detector 2, or both. It can consist of a separate electronic circuit or processor, or it can be a function that resides within the processor 54. The detection signals are generally sent directly to processor 54 from the linear sensor 2 so they can be processed into hyperspectral image data before being sent to the requesting system or host, if there is one. In addition, as will be discussed in more detail later, the liquid crystal variable retarder may include a temperature sensor, such as a thermometer, 30. Such a thermometer can be fabricated within a LC cell of the LC variable retarder by patterning a thermistor into the electrode. It also may be a thermistor or a similar electronic component that is in thermal contact, meaning that the component is thermally connected, with the LC variable retarder or that senses the approximate temperature of one or more LC cells. The HSI data is acquired by processing multiple images taken by the monitor at multiple times and multiple retardances provided by the liquid crystal variable retarder under the control of the retardance controller.

The retardance extractor 27 can extract the actual retardance at each point in time from either information in the series of images from the linear sensor 2, a series of partial images from the linear sensor, selected pixel values from the linear sensor, single pixel values from the linear sensor, or from signals from the photodetector 47 or other light sensor. Retardance extraction can be performed following the method as described in Mitsuo Takeda, Hideki Ina, and Seiji Kobayashi, "Fourier-transform method of fringe-pattern analysis for computer-based topography and interferometry," J. Opt. Soc. Am. 72, 156-160 (1982) to extract the phase delay at each point in the recorded interferograms. The system then has a series of images at known retardances, which processor 54 then processes to produce the HSI data to send to the requesting application on the host device or on the monitor. Alternatively, if the retardance controller has high enough accuracy, no need exists for the retardance extractor. This is because the acquisition of each image has been synchronized with the timing of the retardance controller and the retardance of each image within the series is sufficiently close to that commanded by the monitor processor 54.

According to aspects of the preset disclosure, as indicated above, the HSI imager is configured as a full-width-array (FWA) line imager configuration, in which detector 2 is a linear array of sensing elements. In such a configuration, the HSI imager images a 1D scene onto the linear array. The optics could comprise a 1:1 erect imaging system, such as a SELFOC™ lens array (SLA). The 1D scene could be a line of information on some medium, such as an output sheet of paper or a photoreceptor belt, oriented in the cross-process direction of a reprographic printing system. The 1D scenes are collected as the output sheet or photoreceptor move past the HSI imager on a belt or drum as described above.

The spectral resolution $\Delta\lambda$ at each wavelength $\lambda$ and each point in the hyperspectral image is given by the formula $\Delta\lambda=2\pi\lambda/\Delta\phi$, where $\Delta\phi$ is the range of optical phase delays at which the interferogram is recorded, expressed in radians. From this formula it is apparent that to resolve wavelength differences significantly smaller than the center wavelength, interferograms must be recorded with ranges of optical phase delay $\Delta\phi>>2\pi$. This requirement differentiates the current embodiments from liquid crystal tunable filters that typically do not need to scan the phase delays of their constituent liquid crystal stages beyond a range of $2\pi$. Furthermore, the range of phase delay is a function of wavelength $\lambda$, liquid crystal birefringence $\Delta n$, and position-dependent effective thickness of the liquid crystal layers $\beta$, expressed with the following equation: $\Delta\phi=2\pi\Delta n(\lambda,T,V)\beta(x,y)/\lambda$. Here, birefringence is a function of wavelength, temperature T, and time-dependent liquid crystal voltage V, and expresses the birefringence between two rays normally incident to the liquid crystal variable retarder with ordinary and extraordinary polarization. The change in incidence angle of the chief ray with position of a given pixel on the image sensor, and the corresponding position dependence of the optical phase delay range are incorporated into the position-dependent effective thickness $\beta$.

The output signals of detector 2 will typically represent frames of image data detected by the sensor with each frame acquired at a particular state of the liquid crystal variable retarder and stored in memory or transferred directly to the control device 54.

As described above, the HSI imager is configured to generate frames of information (in this case, a "frame' is a 1D array) as a function of time, during which the phase delay is varied for each frame. It is to be appreciated that, if N frames are needed to get proper hyperspectral information (e.g., a full interferogram is generated at the image sensor), and each frame takes a time dT to capture, and the velocity of the medium in the process direction is P, then the equivalent distance dY in the process direction on the medium during which HSI imager acquires HSI information is $dY=P*N*dT$. If the reprographic printing system is configured to generate the same image information at the photoreceptor (or output sheet of paper) over a distance dY in the process direction, then the result of capturing N frames/lines of information can be Fourier transformed for each cross-process location X, corresponding to a particular image sensor location (e.g., a pixel or given sensor area), giving hyperspectral information at each location X, the information being averaged over a distance dY. This hyperspectral information can then be used to evaluate performance of the reprographic printing system, and also could be used to generate feedback information to the reprographic printer system controller to adjust printer performance in the X direction. This configuration can be called a "spatially-resolved linear HSI", or "spatially-resolved ILS". It is to be appreciated that although the same information is to be printed over a distance dY at any location along the Y, the image information in the cross-process direction X may vary.

Since the liquid crystal retarder and the image sensor are located in the same or conjugate image planes, the image sensor can independently sample and record the intensity oscillations or interferogram at each pixel in an image. The signal output as a function of time (i.e., the interferogram) from each pixel of the detector can be transformed into spectral information signal (i.e., spectral information as a function of time) for that pixel by Fourier transformation of the signal output (i.e., the interferogram) as described in the above-identified co-pending patent applications.

If a specific retardance is required during an extended period of time, for example holding the retardance at 0 for traditional non-hyperspectral imaging, the retardance of the variable retarder could be set to a desired value and maintained at that value over time. In another modality, an effective retardance could be accomplished over time by continuously varying the retardance in such manner that the average retardance over time is the desired one.

Figure 4:
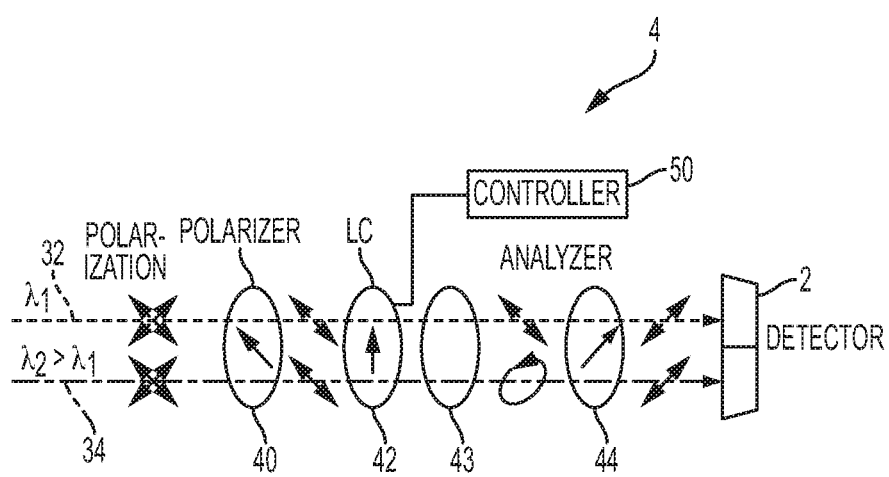
FIG. 4 shows a ray diagram of an example of a hyperspectral imaging optical path.

HSI filter component 4 may have many different configurations. FIG. 4 shows one example. In the embodiment shown in FIG. 4, two unpolarized, collimated, monochromatic beams of light 32 and 34 are depicted, with the upper beam having a shorter wavelength $\lambda_1$ than the lower beam, $\lambda_2$. The optical path has an input polarizer 40 that polarizes incident light. The variable retarder 42 (also referred to herein as a liquid crystal cell) has an alignment orientation 45 degrees with respect to the first polarizer.

Figure 5:
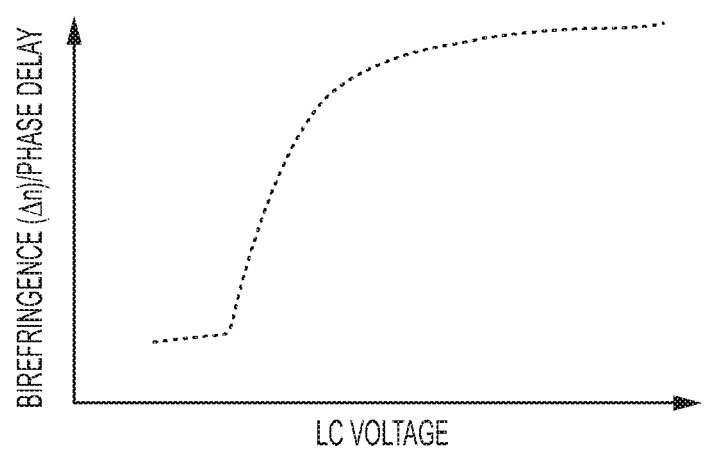
FIG. 5 shows a graph of an example of phase delay versus liquid crystal voltage.

As shown in FIG. 5, each voltage applied to the liquid crystal variable retarder 42 produces a characteristic birefringence or optical phase delay as measured between the polarization component parallel to the liquid crystal variable retarder's slow axis with respect to the component that is perpendicular to the liquid crystal variable retarder's slow axis. The plot in FIG. 5 shows the equilibrium phase delay of a liquid crystal variable retarder as a function of voltage, that is, the phase delay obtained at a given voltage after allowing the liquid crystal to fully relax at that voltage. The liquid crystal variable retarder has a controller that applies a time-dependent voltage waveform to one or more electrodes on its constituent LC cells. This voltage waveform can be chosen to cause the optical phase delay to change at a nominally constant rate over time for a given wavelength. Or, it can be chosen to cause the retarder to be at specified retardances at specified times. An output polarizer 44 (also referred to herein as an analyzer) converts the variations in polarization induced by the liquid crystal variable retarder to variations in light intensity. One or more of the polarizers may consist of a wire grid polarizer.

Figure 6:
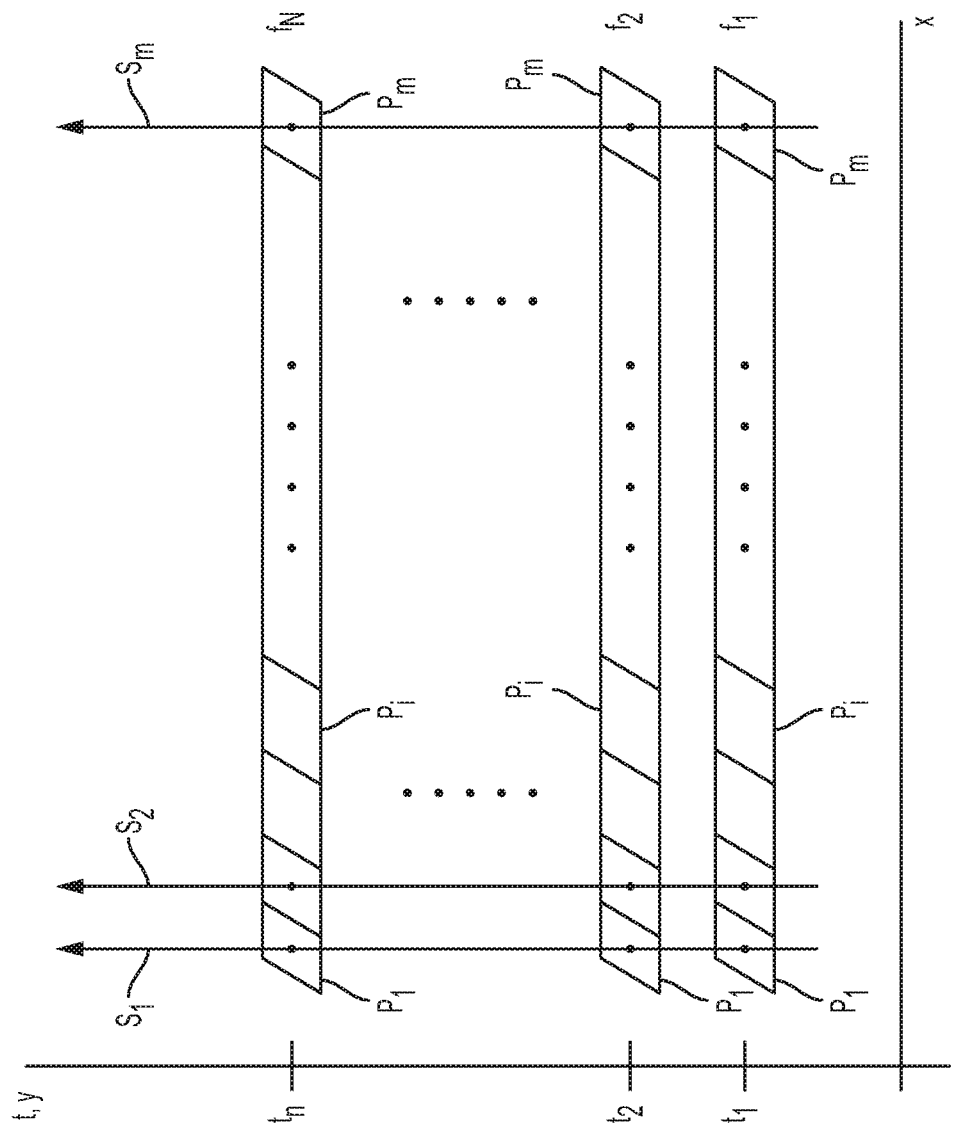
FIG. 6 is a schematic representation of an example of a set of data from a linear sensor of a monitor.

FIG. 6 is a schematic representation of a set of data from a linear sensor of a monitor. The rows of data at times $t_1$, $t_2$ ... $t_n$ correspond to multiple frames $f_i$ of information. Each frame includes information along the cross-process direction collected along the linear sensor length. Portions along the cross-process direction may correspond to a single pixel or multiple pixels binned together. Each frame corresponds to an image of a different location along a uniform portion of a test patch as it moves relative to the monitor in the process direction. The printed test patch is printed with the goal of achieving a uniform printed image in the process direction (e.g., such that a given pixel or given group of binned pixels of the linear sensor receives same information from the test past over the series frames). Typically, the test patch is also printed with the goal of achieving a uniform printed image in the cross process direction (e.g., such that all pixels of the linear sensor receive same information from the test past over the series frames), however, the test pattern may have variation in the cross-process direction.

As each frame is captured, the filter is in a different state. The frames are taken over a time N*dt such that the outputs from a given pixel (i.e., in the various frames) constitute an interferogram for that given pixel. Processor 54 (shown in FIG. 3) performs a Fourier transform of a given one of signals $S_1$, $S_2$ ... $S_m$ (each of which is comprised of outputs of a given pixel or binned pixels over time period T) which results in spectral information for a given location along the cross process direction, as indicated above, such that spectral characteristics of the printed image can be compared to one another and/or to target spectral characteristics (e.g., in the form of a look-up table) to determine how well the printer printed a test patch which met the intended goals. Processor 54 or controller 200 can make adjustments to one or more of the printer components to address any failure to achieve the intended goal(s).

Figure 7:
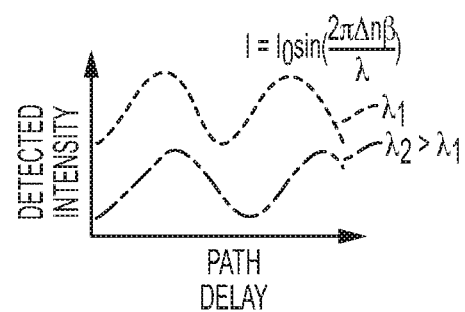
FIG. 7 shows a graph of detected intensity versus phase delay.
Figure 8:
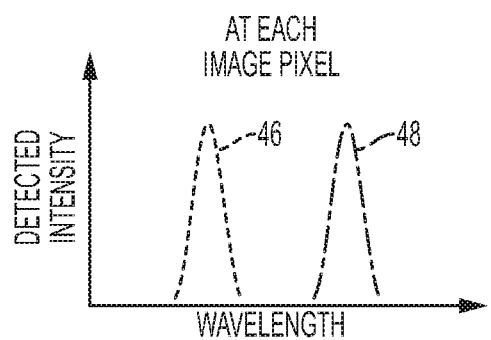
FIG. 8 shows a graph of detected intensity at each image pixel versus wavelength.

The resulting time-dependent variations in intensity of a signal $S_i$ picked up by linear array 2 (with the detected intensity being a function of path delay) are shown in FIG. 7 and the detected intensity versus wavelength (i.e., after Fourier transformation of a signal $S_i$) are shown in FIG. 8. The upper curve of FIG. 7 corresponds to the detected intensity variations of the shorter wavelength ray 32 in FIG. 4, while the lower curve of FIG. 7 corresponds to the detected intensity variations of the longer wavelength ray 34. Similarly, the peak 46 in FIG. 8 corresponds to the shorter wavelength ray 32 while the peak 48 corresponds to the longer wavelength ray 34.

Figure 9:
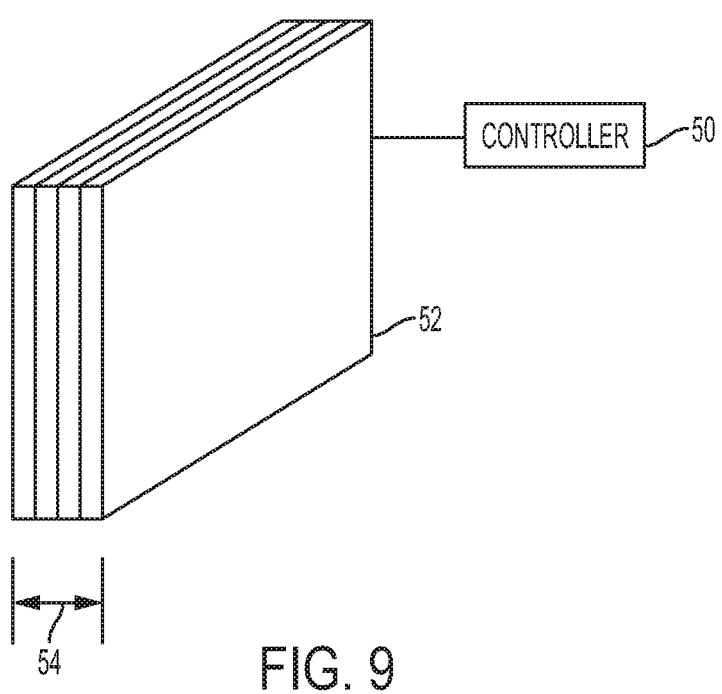
FIG. 9 shows an embodiment of a liquid crystal variable retarder device consisting of multiple, stacked liquid crystal cells.

Some embodiments achieve retardance through high optical path delays between the two polarization components while maintaining low liquid crystal driving voltages and/or fast liquid crystal response times. As is known in the art of Fourier transform spectroscopy, high optical path delays yield high spectral resolution, and are therefore beneficial. However, a high optical path delay generally implies a greater total thickness of liquid crystal. To keep the driving voltages and response times low, a single thick liquid crystal cell can be broken up into multiple cells in series, as shown in FIG. 9.

The liquid crystal response time for an individual cell at a given voltage scales as the square of the cell thickness, so two liquid crystal variable retarders (also referred to as modules) with identical path delay, one a single cell, and one split into two cells, would have a switching time differing by a factor of 4. Conversely, if the switching time is held constant, the two modules would differ in switching voltage by a factor of 4. The embodiment of FIG. 9 consists of 4 LC cells 52. The cell stack may be controlled by a central controller (e.g., controller 50) that manages the optical path delay as well as the liquid crystal response times with proper choice of voltage waveforms. As is known in the art, multilayer stacks of optical components such as the embodiment shown in FIG. 9 benefit from the proper choice and application of antireflection coatings at each optical interface.

If one layer or cell of a multilayer liquid crystal stack has any symmetry-breaking features, these features should be alternated or opposed between layers such that the stack as a whole retains favorable symmetry properties. Such symmetry-breaking features can be considered to have a polarity, which refers generally to the notion of whether a symmetry-breaking feature is directed along or in opposition to a test direction. The polarity with which electrodes are connected to a voltage source is one such feature, wherein the notion of polarity is immediate. The liquid crystal alignment direction is another such feature, wherein the notion of polarity can be made concrete by considering the rubbing direction of the upper-most electrode of a liquid crystal cell as seen in a cross-sectional depiction of the cell in a plane that is parallel to the LC directors, such as FIG. 11A. If the rubbing direction is to the right, as shown, we can say the cell has positive polarity, whereas the mirror image cell with the rubbing direction to the left would have negative polarity.

For a conventional antiparallel cell, all liquid crystal molecules tend to be oriented in the same direction, which corresponds to the rubbing direction of an electrode. Such a configuration has a first-order dependence of optical path delay on incident light angle as the incident angle deviates from the normal. If two antiparallel cells are stacked with opposite polarities such that their alignment directions oppose each other, then the first order dependencies of optical path delay on incident light angle are equal and opposite and hence cancel each other out. Therefore, by paying careful attention to the arrangement of polarities of symmetry-breaking features of stacks of liquid crystal cells, it is possible to maintain an incident light angle dependence of optical path delay of second order or higher, as well as other advantageous operating characteristics.

It becomes more critical to shorten the response time of the LC variable retarder cell if the application demands taking multiple hyperspectral images in succession, as in a hyperspectral movie. Typically, LC cells are switched on and then passively allowed to relax. In one embodiment, the LC cell is actively switched between a configuration with a maximal optical phase delay and a configuration with a minimal optical phase delay. This active switching may be implemented in many ways. In one embodiment, each electrode of the pair of electrodes that traditionally surround the LC material has been replaced with a pair of interdigitated electrodes.

Figure 10:
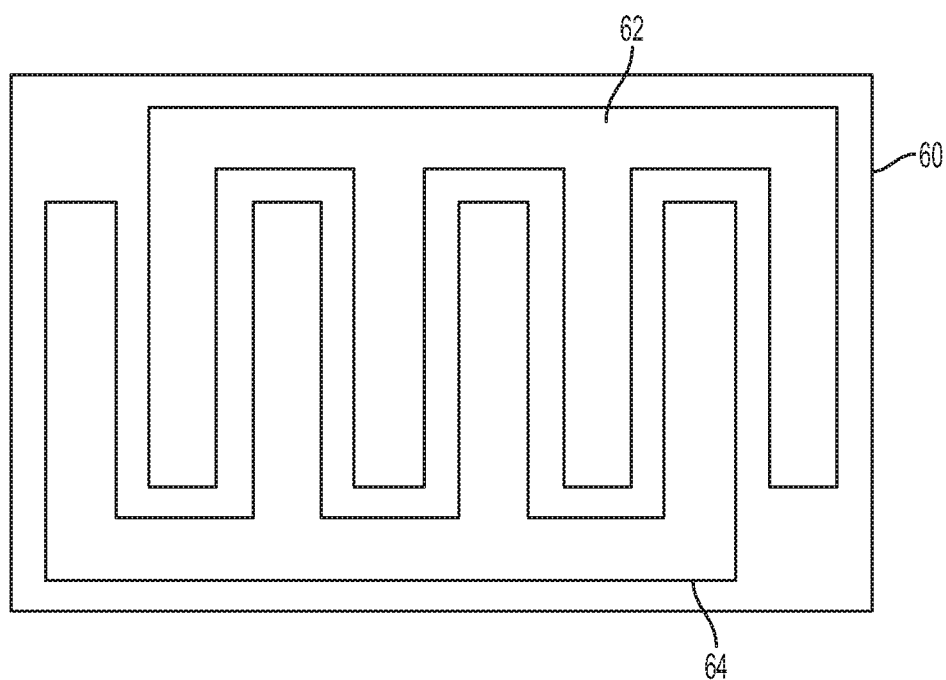
FIG. 10 shows a top view of an electrode panel of one embodiment of a liquid crystal variable retarder device, having a pair of electrodes on each side of a single liquid-crystal layer.

FIG. 10 shows one set of interdigitated electrodes 62 and 64 on panel 60 that would replace one planar electrode in a traditional configuration. In this embodiment, panel 60 refers to the optically transparent substrate that surrounds the liquid crystal material to form a liquid crystal cell, and on which the electrode layer resides. Therefore, this panel would be replicated on the other side of the LC material. In one embodiment, the panels that surround the LC material would include a set of electrodes that allows one to switch the electric field between a primarily perpendicular orientation with respect to the substrate, and another pair to switch the electric field to a primarily parallel orientation. By correct application of voltages to each set of electrodes, the LC molecules can rotate, controllably in time between perpendicular and parallel orientations, or more generally between an orientation providing a minimal optical phase delay and orientation providing a maximal optical phase delay. These embodiments may be referred to as active-on and active-off embodiments, wherein the LC material is actively switched between states rather than switching the material to an 'on' state and then passively allowing it to relax.

Another aspect of response times is the selection of the LC material itself. When choosing an LC material, one has to balance multiple factors such as optical birefringence, dielectric anisotropy, and rotational viscosity. An LC material with high optical birefringence would result in thinner LC cells that achieve the same optical retardance as a thicker LC cell, with a benefit in lowered response time and/or driving voltage, partially offset by the typically increased rotational viscosity of such high birefringence materials.

An LC material with a high dielectric anisotropy would produce the same response as a lower dielectric anisotropy material but from a lower drive voltage. An LC material with a lower rotational viscosity would have a faster response time than a material with a higher rotational viscosity. As will be discussed in more detail later, material-dependent properties such as optical dispersion and temperature dependence of refractive index and rotational viscosity can be calibrated out of the system performance, but the LC material may still be selected to optimize the system performance post-calibration. In another embodiment, an LC material and/or LC cell preparation may be used to give the LC a larger 'pretilt' angle because this decreases the LC switching time.

In addition to fast response times, high viewing angles increase the usefulness of the hyperspectral imaging component. While hyperspectral imaging systems currently exist, many of them have limited viewing angle due to the angle-dependent properties of the optical filters employed. As used here, 'viewing angle' refers to the level of invariance of the optical phase delay for a given wavelength and a given state of the liquid crystal variable retarder component with respect to deviations of the incident light angle from the normal of the LC variable retarder component.

Typically, liquid crystal displays (LCDs) are designed as switchable half-wave plates between crossed polarizers that can alternate between light transmitting and light obscuring states. The term 'viewing angle' as used here differs from the conventional usage as applied to typical LCDs, which refers to the angle that a specific contrast ratio is reached between the on and off states. In the embodiments here, the LC may function as a high-order wave plate. Because a single point in an image will be formed with a cone of light rays that has a non-zero numerical aperture (NA), each ray of the cone travels at a different incident angle through the LC variable retarder cell. Consider the difference in optical phase delay at a given wavelength between the ray with the most delay and the ray with the least delay within the cone of light rays that form a single image pixel. As this difference in phase approaches $\pi$ radians the contrast of the interferogram recorded at this image pixel decreases.

High total optical phase delay is necessary to achieve high spectral resolution at a given wavelength; however, the average variation of the optical phase delay over the incident light angles of the rays corresponding to a single image pixel must be significantly less than $\pi$ radians. The variation in optical phase delay as a function of angle is proportional to the total optical phase delay, so high spectral resolution imaging is challenging because it combines the above two conflicting requirements of high total optical phase delay with minimal phase delay variation as a function of angle. Therefore, in order to successfully obtain high spectral resolution HSI data, either the imaging NA has to be decreased to decrease the range of angles corresponding to the rays that form an image pixel, or the viewing angle of the liquid crystal variable retarder must be increased. Because decreasing the imaging NA decreases the optical throughput of the system, it is often desirable to develop techniques that increase the viewing angle to image with high spectral resolution while maintaining high optical throughput.

One particular embodiment of an LC cell that achieves an extended viewing angle uses parallel rubbing layers, known as a pi-cell or optically compensated bend (OCB) cell. The two alignment layers internal to the liquid crystal cell may be rubbed in parallel directions, shown as 72 in FIG. 11A, versus in anti-parallel directions, shown as 70 in FIG. 11A. This causes the top half of the cell to act like the mirror image of the bottom half with respect to a mirroring plane halfway between the bottom and top halves of the cell, incurring similar symmetry advantages as stacking two anti-parallel cells with opposite alignment directions as discussed previously. Light rays traveling at different angles through the cell, shown in FIG. 12, see the same optical path difference to first order in incident angle between ordinary and extraordinary polarizations. This first-order invariance to incident angle arises because first-order deviations in optical path difference have opposite sign in the top and bottom halves of the cell and therefore cancel each other out.

Figure 11A:
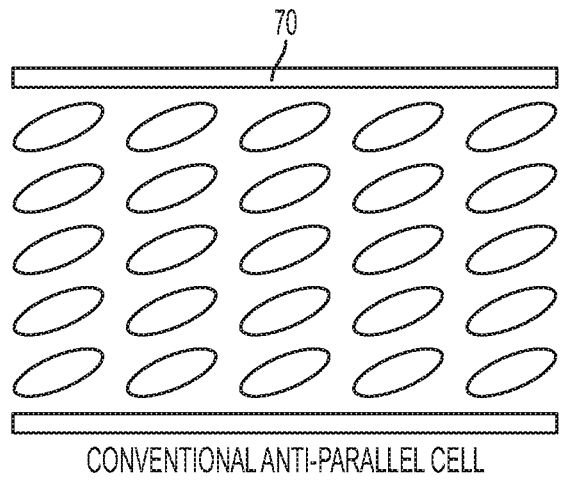
FIGS. 11A and 11B shows a comparison between a standard anti-parallel alignment liquid crystal cell and an embodiment of an optically compensated bend cell.
Figure 11B:
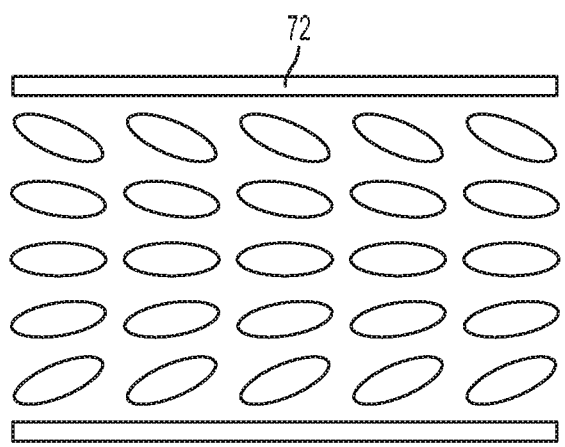
Figure 12:
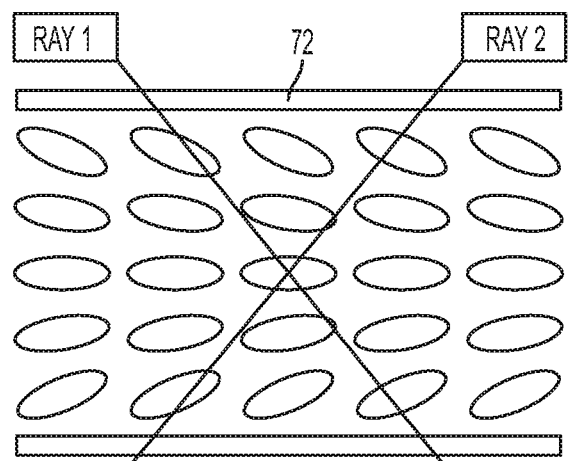
FIG. 12 shows a ray diagram of an optically compensated bend cell.

Another embodiment, the double-nematic cell, involves stacking two conventional anti-parallel cells, such as 70 in FIG. 11A with the LC alignment direction of one rotated 180 degrees with respect to the other, as described previously with reference to FIG. 9. This would perform similarly to the pi-cell except with the top and bottom halves housed in separate cells stacked on top of one another, thereby providing advantages of decreased driving voltage and/or faster response. Other embodiments may include stacks of double-nematic cells, single- or multiple-domain, vertically-aligned (VA) LC cells and in-plane-switching (IPS) LC cells.

Stacking two double-nematic cells with their alignment directions at 90 degrees to each other would provide a liquid crystal variable retarder that could achieve both positive and negative retardances and that would also have a high viewing angle.

When light rays travel through a birefringent medium, they can undergo an effect referred to as 'beam walk-off' in which the wave vector and the Poynting vector are no longer parallel. The embodiment of two layers with opposed symmetry provides a remedy for this, because the walk-off of the first would be corrected by the walk-off of the second. In general, symmetry-preserving arrangements of LC cells in which walk-off is cancelled between two cells or two cell halves with opposite symmetry properties could correct this walk-off. IPS LC cells would not have a walk-off issue because beam walk-off is minimal when the wave vector is perpendicular or parallel to the LC director. If walk-off is not corrected, the image may drift as a function of voltage on retardance of the LC variable retarder, creating artifacts on the edges within the image once the Fourier transform was obtained. However, it may still be possible to correct this walk-off algorithmically, neglecting dispersive effects of the liquid crystal, by image registration techniques.

Having demonstrated different embodiments of the structure of monitors having HSI capabilities, the discussion now turns to additional elements and the methods of operating the monitors, as well as their calibration.

Figure 13:
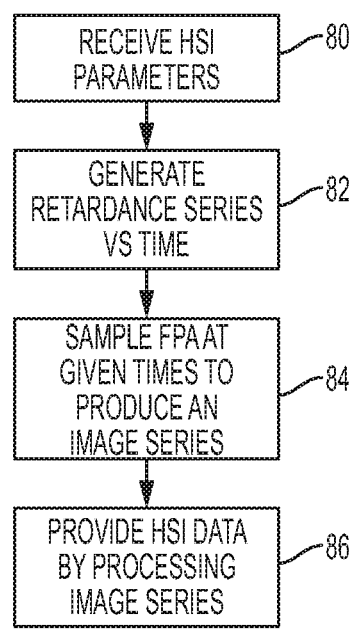
FIG. 13 shows a flowchart of an embodiment of a method of operating a hyperspectral imaging system.

FIG. 13 shows an embodiment of a flowchart of operating the HSI system, which may be better understood if viewed in conjunction with the system diagram of FIG. 3. At 80, the processor 54 in FIG. 3 receives HSI parameters specified by an application running on the host device that describe required features of the hyperspectral image data, or are set by a user or an application running on a standalone monitor. The HSI parameters may require, for example, certain hyperspectral image data with a given spectral resolution to be acquired in a given time. Or, they could require a minimal set of hyperspectral image data that would allow distinguishing between specific spectral features known a priori. At 82, the processor 54 determines a number of images N that should be acquired, at which retardances $\Gamma_1$, $\Gamma sub_2 \ldots \delta_N$, and at which times $t_1 < t_2 < \ldots < t_N$. The clock 25 may synchronize the events in the hyperspectral imaging process, such as the image acquisition times, the linear sensor acquisition times, the linear sensor trigger times, the changes in retardance controlled by the retardance controller, etc. The processor 54 sends the series of retardances at specified times to the retardance controller. The retardance controller takes the desired retardances at desired times and produces a series of voltages at a series of times. The voltage times may differ from the retardance times, either in number or value. The voltages cause the liquid crystal variable retarder to switch retardances from a first retardance at a first time to a second retardance at a second time, etc. In most cases, switching to the same retardance but within a different time interval will require a different voltage series.

The term voltages as used above refers to a vector where each element of the vector corresponds to one particular electrode potential with response to a reference voltage, such as system ground. In some embodiments, such a vector could be a vector of AC voltages characterized by phase, amplitude and frequency applied to each electrode. By using different frequencies the retardance controller can take advantage of the non-uniform frequency dependence of some liquid crystals, such as the frequency-dependent dielectric anisotropy. The monitor processor also can trigger linear sensor 2 at the times of the retardance time series to sample linear sensor 2 at 84, to produce a series of images at the retardances commanded by the processor.

The retardance extractor 27 can extract the actual retardance at each point in time from either information in the series of images from the linear sensor 2, a series of partial images from the linear sensor, selected pixel values from the linear sensor, single pixel values from the linear sensor, or from signals from the photodetector 47 or other light sensor. Retardance extraction can be performed following the method as described in Mitsuo Takeda, Hideki Ina, and Seiji Kobayashi, "Fourier-transform method of fringe-pattern analysis for computer-based topography and interferometry," J. Opt. Soc. Am. 72, 156-160 (1982) to extract the phase delay at each point in the recorded interferograms. The system then has a series of images at known retardances, which the processor 54 then processes to produce the HSI data at 86 to send to the requesting application on the host device or on the monitor. Alternatively, if the retardance controller has high enough accuracy, no need exists for the retardance extractor. This is because the acquisition of each image has been synchronized with the timing of the retardance controller and the retardance of each image within the series is sufficiently close to that commanded by processor 54.

Some liquid crystal materials experience a change in sign of the dielectric anisotropy at a certain driving frequency. Driving the material below this frequency causes the molecules to align parallel or perpendicular to the driving electric field, and driving above this frequency causes the molecules to align at 90 degrees with respect to their alignment at the lower frequency. This feature can be used in an active-on and active-off embodiment by switching the liquid crystal between two orientations with the choice of drive frequency.

Characteristics of the hyperspectral imaging system may require calibration. For example, the calculated wavelength of a monochromatic source as a function of position over the image sensor may not appear uniform, because the LC cell may have a non-uniform thickness, and there is also a dependence of calculated wavelength on angle of the chief ray at each pixel position. A calibration would take this information into account so that a processed HSI dataset of a monochromatic source, such as a laser, would show a spectral peak at the same wavelength in all image pixels. For example, a laser source may have a wavelength of 532 nanometers. Directing light from the laser source through the HSI image sensor and then determining the peak wavelength at a certain point on the image sensor by obtaining HIS data of the light from the laser source may result in a peak being detected at 540 nanometers. The application software could be programmed to adjust for this offset. Due to the smoothly varying nature of this offset as a function of position, the calibration process may be performed at a few points or pixel-binned regions in the image plane and then interpolated across the entire image plane, or it could be performed individually at all pixels.

In addition, the index of refraction/dispersion of the LC, as well as its rotational viscosity and other material parameters, may vary as a function of temperature, and there may be some hysteresis inherent in the switching process. Therefore, the retardance controller should be calibrated and optimized to provide the correct voltages to the electrodes of the LC cells within the LC variable retarder as a function not only of time but also of imaging speed and operating temperature, etc. This calibration of the retardance controller or the above calibration of spectral offsets may be assisted by pointing the HSI image sensor at a fluorescent light bulb or other light source that has multiple known spectral lines. This would be especially useful when optical dispersion is present and multiple spectral peaks are needed to estimate the dispersion.

Referring back to FIG. 1, it can be seen that there is a light source 15 pointing away from the aperture to illuminate the subject being imaged. Referring to FIG. 3, one can also see a second light source, in this embodiment in the form of a laser diode 20 that may illuminate the sensor or the elements internal to the HSI optical path. Alternatively the laser diode 20 may also be a light emitting diode, a superluminescent light emitting diode, a filtered broadband light source, or any other light source of known spectral characteristics. A light source may also just provide general illumination of a scene. A monochromatic outward facing source may be useful as a spectroscopic source, such as for imaging Raman spectroscopy. The light source may consist of broadband outward or inward facing sources used for illumination, such as infrared LEDs for night vision, or one or more LEDs with specific spectral output that combine to form a true "white light" source with flatter spectral output than typical white LEDs.

In the calibration process, the light sources included as part of the device may be used as the calibration light source. The sources should have known spectral characteristics that allow adjustment of the various performance characteristics of the hyperspectral system based upon those characteristics, such that the calculated spectrum at each image pixel accurately reflects the known spectrum of the calibrated source with the highest possible spectral resolution.

The retardance controller is in theory capable of knowing the current state of the LC variable retarder. For example, the LC variable retarder can be initialized in a given state on power-up, or at any point during operation. One possible way to initialize the LC variable retarder is to drive it at a voltage high enough to quickly bring it into equilibrium in its minimum or maximum retardance state. In order for the retardance controller to go from input, such as retardance at specified times, to output, voltages versus time, the retardance controller can use a look-up table, physical model, heuristic algorithm, etc. as a reference. It can also take into account the starting retardance of the liquid crystal variable retarder.

An important aspect of the retardance controller is its ability to produce the correct voltage series for a given retardance series, even if the time series describing when the retardances should be achieved differs. The output of the retardance controller therefore must have a functional dependence on both the retardance series and the time series, not just the retardance series. One should note that the time series is generally ordered but the retardance series is not. If the time intervals between adjacent retardance series members is longer than the liquid crystal variable retarder's relaxation time, the system is said to be adiabatically driven and the voltage series should be relatively independent of the input time series. However, if the time intervals between adjacent retardance series members is less than the liquid crystal variable retarder's relaxation time, the system is said to be dynamically driven because the required voltage series depends strongly on the time series. In other words, the retardance controller is a dynamic retardance controller.

Figure 14:
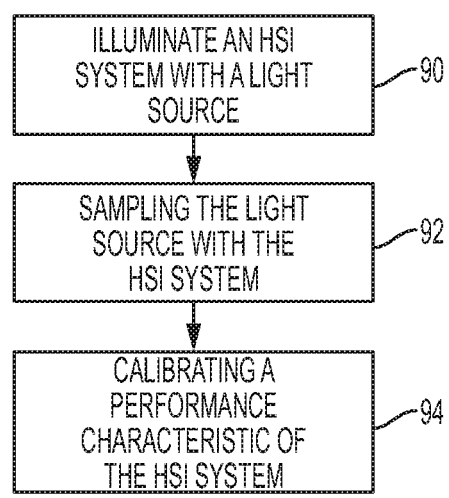
FIG. 14 shows a flowchart of an embodiment of a method of calibrating a hyperspectral imaging system.

FIG. 14 shows an embodiment of a calibration method. At 90, the HSI system is illuminated with a light source. The light source may be a monochromatic inward facing light source, producing light rays that pass directly to the hyperspectral component rather than first reflecting off external scenery. The light source is sampled with the HSI system, and used to calibrate a performance characteristic of the system. This may allow for calibration of the retardance controller or determination of an optimal LC driving waveform, for example. Such a calibration could be performed in a factory setting.

Figure 15:
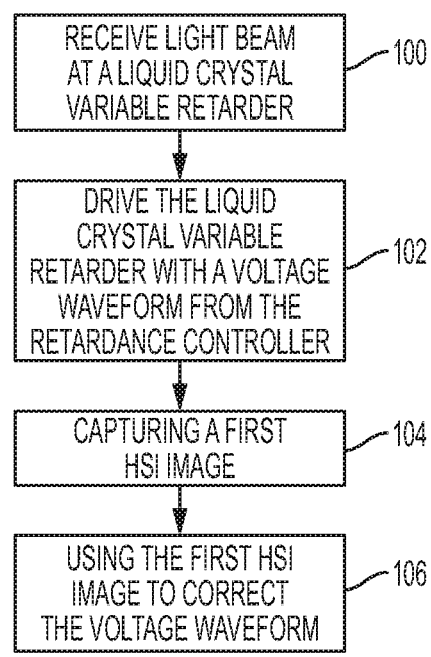
FIG. 15 shows a flowchart of an alternative embodiment of a method of calibrating a hyperspectral imaging system.

The calibration could also be updated during normal use as in FIG. 15 to compensate, for example, for aging of the LC variable retarder. Light is received at the LC variable retarder at 100, and a set of voltages determined by the retardance controller 50 may be used to drive the LC variable retarder at 102. This set of voltages drives the LC variable retarder while hyperspectral image data 104 is captured of the received light 100 which includes light from a calibration source, such as from the laser diode 20 in FIG. 3, or from a nearby fluorescent lamp. Given that the spectral properties of the calibration source are known, it is possible to calculate the time-dependent optical retardance of the LC variable retarder, that is, to measure a calibration retardance, and compare it to the desired retardance that was used by the retardance controller to synthesize the voltage waveform. The retardance controller can then be updated based on the discrepancy between desired and actual retardance to generate a voltage waveform that would more accurately control the retardance as a function of time at 106. For example, the measured center wavelength can be made to more closely approximate a known center wavelength of received light at 100, with better spectral resolution as well, after proper adjustment of retardance controller and the time-dependent driving voltage waveforms it generates. Another option would be to have the retardance-versus-time characteristic follow a linear trajectory. Any or all of the performance characteristics, calibration information, and properties of the light used for calibration can be stored in look-up tables embedded for example in the memory of processor 54 to allow for comparison and adjustments.

One should note that the HSI system may use calibration data from other sources, rather than generating the calibration data itself. While the calibration data generated in the above self-calibration process may be stored in the memory of the HSI system, the memory may also store calibration data provided with the system, available from other sources, etc. There is no limitation intended nor should any be assumed that the only calibration data available is if the system performs the above-described processes.

In some embodiments it may be advantageous to perform pixel binning, whereby the intensity values recorded at neighboring pixels in a region of the linear sensor are summed together either directly on the linear sensor or later in software. If the pixels are binned together at the linear sensor before they are read out, it is generally possible to increase the frame rate of the linear sensor. This assumes a fixed maximum communication speed between the linear sensor and the device that records the data from the linear sensor, such as the processor 54. Varying the number of pixels binned thus allows one to trade-off between spatial resolution and imaging speed, and since there is also a tradeoff between imaging speed and spectral resolution, pixel binning is yet another method to trade off between spectral and spatial resolution and imaging speed. In addition, pixel binning may be important for increasing the signal-to-noise ratio of an image, especially when signals are weak and minimal spatial resolution is needed. In an extreme limit, all pixels could be binned together, and the embodiment would function as a non-imaging Fourier spectrometer.

Pixel binning may be particularly useful for calibration of various smoothly-varying position-dependent quantities of the linear sensor such as the position-dependent variation in optical phase delay at a given wavelength and state of the liquid crystal variable retarder. In order to get reliable calibration information it may be necessary to achieve a high signal-to-noise ratio, whereas not much spatial resolution would be needed because of the smoothly varying nature of the quantities needing calibration. Calibration information across the field of view of the HSI system could be interpolated from the measured results.

The retardance controller can have the ability, in addition to taking into account different time series, to optionally account for different temperatures, because temperature affects the dynamic properties of the liquid crystal material such as dielectric anisotropy, rotational viscosity, and elastic constants, as well as affecting the birefringence. However, this is optional because if the melting point of the liquid crystal material is high enough relative to the operating temperature, the liquid crystal material will not be that sensitive to temperature. The controller can be fully calibrated in the factory and be fully open loop, and if this calibration is dependable enough, the phase reference, in this embodiment, the laser diode 20, is not needed, nor is the retardance extractor 27. However, even if the calibration is fixed in the factory, it may be helpful to have the phase reference to know the actual retardance of the acquired images.

Figure 16:
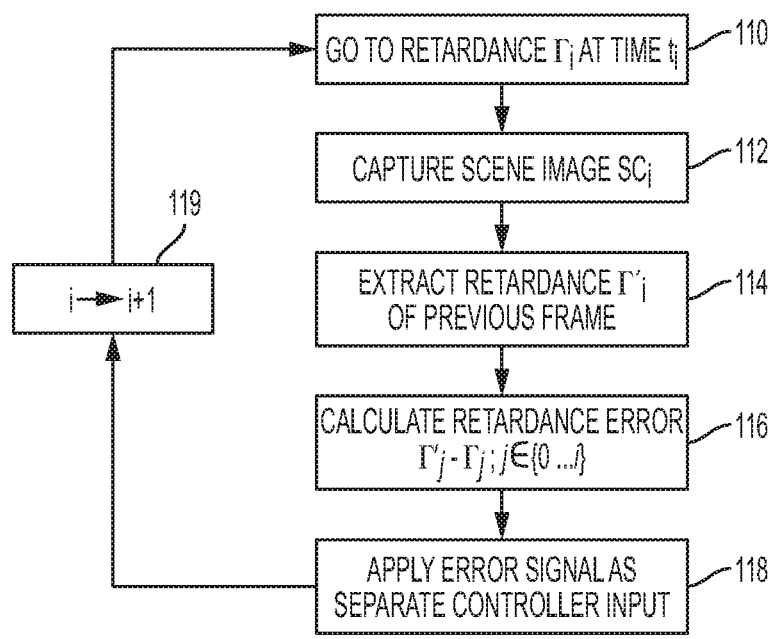
FIG. 16 shows a flowchart of closed-loop control of retardance.

If desired, the retardance controller can update itself between acquisitions of hyperspectral image data as described previously in reference to FIG. 15. It does this by comparing the requested retardance series with the actual retardance series as reported by the retardance extractor 27 or possibly by the processor 54, and updating the retardance controller based on the discrepancies between the two. It is even possible to generate an error signal from the requested and actual retardance series and to use the error signal to drive the liquid crystal variable retarder in a closed loop manner in real time, whereby the error signal is used to compute a correction to the voltages calculated by the open loop retardance controller FIG. 16 shows an example of such a process.

At 110, the retardance controller 50 of FIG. 3 sets a given retardance $\Gamma_i$ at a time, $t_i$. The scene image $SC_i$ is then captured by linear sensor at 112. The retardance extractor then extracts the retardance $\Gamma'_i$ of the previous frame at 114. The system then calculates the retardance error at 116 by finding the difference between the intended retardance $\Gamma_i$ and the actual retardance $\Gamma'_j$ and applies the error signal as a separate controller input at 118. The system then iterates at 119 and then repeats the process as needed. The system thus operates in a closed loop manner with direct feedback to the retardance controller.

Other modifications and embodiments are possible. In order to decrease imaging time, for example, the system could include an optical bandpass filter, such as a Bayer filter, in front of the HSI component to restrict light hitting the linear sensor to a known spectral band, allowing subsampling of the interferogram without aliasing. An electronic digital or analog bandpass filter that filtered the signals recorded at each image pixel would achieve the same effect. An optical filter may also increase the spectral resolution if one is imaging a spectral feature that occurs near a sharp cutoff of a filter that has sharp cutoffs. As used here, a sharp cutoff, or transition between the passband and the stopband, is one that is sharper than the full width at half maximum of a spectral peak that would be obtained from a monochromatic source if the filter were not present. Such a filter would yield information as to whether the spectral peak occurred below or above the filter cutoff.

Other types of optical filters or optical components, such as different types of optical films, may also be employed in certain embodiments. For example, a retardance compensation device such as a film may be used to achieve a specific retardance in the "on" or "off" state of the LC variable retarder. The filter or film may also provide chromatic compensation to correct for the dispersive effects of the liquid crystal. Or, standard antireflection coatings may be used on or in the LC cells of the LC variable retarder.

The LC electrodes may consist of graphene, indium tin oxide, or other material with high conductivity and high optical transparency. Especially when considering the multilayer embodiments of the present disclosure, the light reflected or absorbed from the electrodes must be minimized, and it is therefore advantageous to maintain high optical transparency in the electrode layers.

Many of the embodiments discussed above have assumed the presence of the HSI component in a similar system as a traditional camera, with the HSI component having a zero-retardance mode to allow the monitor to operate without obtrusion. However, it may be desirable to have the HSI component not in the final focal plane of linear sensor nor in close proximity to it, but instead in a conjugate of the focal plane of the linear sensor and linked to the focal plane of the linear sensor by one or more sets of relay optics. This would enable synchronizization of the driving of the liquid crystal variable retarder with the acquisition of individual image frames.

Alternatively, in addition to making the device transparent to incoming light, it may also be desirable to make the polarizers completely transparent to incoming light. In this embodiment, when the monitor operates in a non-hyperspectral mode, the system does not lose light due to the polarizers. In one embodiment, the system employs a switchable polarizer that can switch between at least two states. One state nominally transmits only one polarization of light and absorbs, reflects or blocks the orthogonal polarization. The other state transmits both polarizations. One can make such a polarizer using anisotropic liquid crystal gels, as set out in H. Ren and S. T. Wu, "Anisotropic Liquid Crystal Gels for Switchable Polarizers and Displays", Appl. Phys.

Lett. 81, 1432-1434 (2002). These polarizers also have the desirable properties of low operating voltage, high contrast ratio, broad bandwidth, wide viewing angle, and fast response times.

Another modification that would apply to one or more of the liquid crystal cells in the liquid crystal variable retarder involves the flatness of these cells. The control of the state of the liquid crystal variable retarder across its clear aperture, that is, the portion of the liquid crystal variable retarder through which light passes to linear sensor 2 or light sensor 47 of FIG. 3, becomes easier when the liquid crystal cells are uniformly thick. The response time at a given point is a nonseparable function of the thickness of a cell as well as the temperature, driving voltages, and other cell properties. Therefore, a given voltage waveform applied to the cell will provoke different responses at points in the cell that differ in thickness. The differences between these responses will also change as a function of temperature. This makes calibration of the retardance controller very difficult, especially if the retardance is only measured at one point in the liquid crystal variable retarder's clear aperture instead of across the clear aperture.

Including spacers in the clear aperture provides one way to make the LC cells uniformly thick. However, the spacers displace the liquid crystal material and therefore they change the retardance variation of the liquid crystal variable retarder at the positions where they are present. This results in their appearance as artifacts in the hyperspectral image data. However, options exist to reduce the significance of these artifacts.

In one embodiment, the spacers have a high aspect ratio, such that the size or diameter of the occluded spot they produce as viewed along the imaging system's optical axis has a small size relative to the spacer height. This causes minimal disruption in the image relative to a low aspect ratio spacer.

Figure 17:
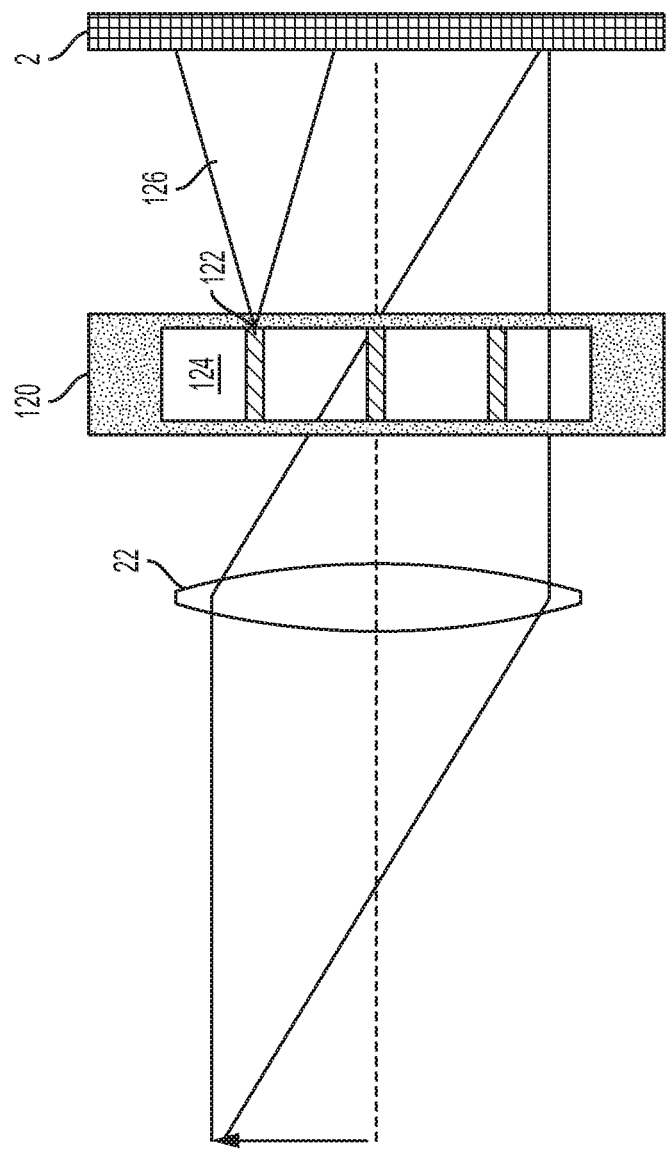
FIG. 17 shows an embodiment of a portion of a hyperspectral imaging system having a liquid crystal variable retarder with spacers within the field of view of the imaging system.

In another embodiment, the liquid crystal cell, the liquid crystal cells, or the liquid crystal variable retarder can move away from the focal plane of the imaging optics within an HSI imager. In fact, the liquid crystal cells of the liquid crystal variable retarder can be individually placed at any location with respect to the imaging optics, as long as they are between the input polarizer and the output polarizer of the HSI filter (shown in FIG. 3). The liquid crystal cells can be adjacent to each other or they can be separate. One or more can be in a focal plane of the imaging optics (e.g., the lens array), a conjugate focal plane, a Fourier plane, between the imaging optics and the scenery to be imaged, between the imaging optics and the linear sensor etc. As long as the cells have sufficiently uniform flatness, the rays that make up a given point in the image can traverse different points of the liquid crystal cells. As these points all have the same thickness within a given cell, these rays all experience the same retardance. Moving the cell away from the focal plane causes a blurring of the occluded spots caused by any spacers within the clear aperture of the cell. FIG. 17 shows an example of this. Note in some embodiments, such as those leveraging principles from the field of computational photography, the linear sensor 2 may also reside away from a focal plane of the imaging optics. If the linear sensor array does not reside in a focal plane of the imaging optics, then in order to blur the spots caused by the spacers as described above, the liquid crystal cell should not reside in the focal plane of the linear sensor.

Figure 18:
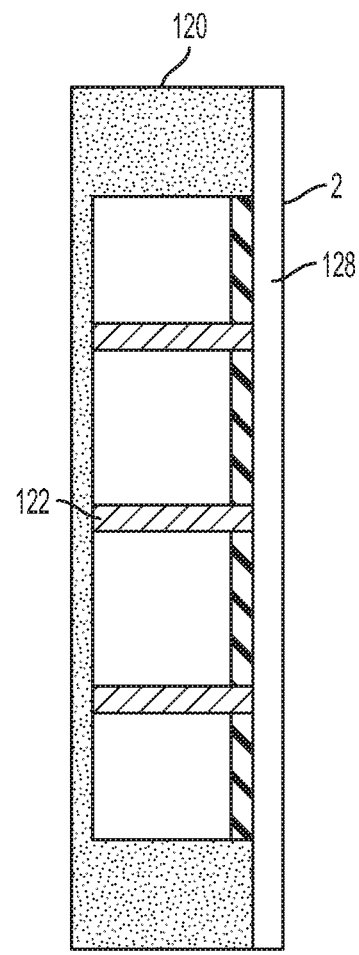
FIG. 18 shows an embodiment of a liquid crystal variable retarder with spacers where the spacers lie between the pixels of a linear sensor.

In FIG. 18, the liquid crystal cell 120, which could represent one or more liquid crystal cells of the liquid crystal variable retarder, has liquid crystal material 124 sandwiched between the two panels, but also has spacers such as 122. The cell 120 now resides away from the focal plane of the imaging optics, which is where linear sensor 2 may lie. The light passes through the imaging optics 22 and all rays experience the same thickness of the cell 120 before striking linear sensor 2. The area in which the spacer 122 may occlude the light is blurred across the region 126. For example, if a spacer with a diameter of 1 micron were placed on a square grid every 10 microns, the spacers would occlude roughly 1% of the clear aperture of the liquid crystal cell in area. If the LC variable retarder cells were directly in the focal plane of the linear sensor or of the imaging optics, the spacers would create visible artifacts. Moving the cells away from the focal plane spreads and thus dilutes the effect of these artifacts across the spatial extent of the hyperspectral image data.

Another option with regard to spacers and the linear sensor involves building the spacers between the pixels of the linear sensor, as shown in FIG. 18. In FIG. 18, individual pixels 128 of linear sensor 2 lie between the spacers such as 122 of the liquid crystal cell, which is built on top of the linear sensor. One should note that FIGS. 17 and 18 are merely portions of the hyperspectral imaging system and that the other elements previously discussed such as the electrodes, LC material, wave plates, polarizers, etc. would be included in a full hyperspectral imaging system using these portions.

Figure 19:
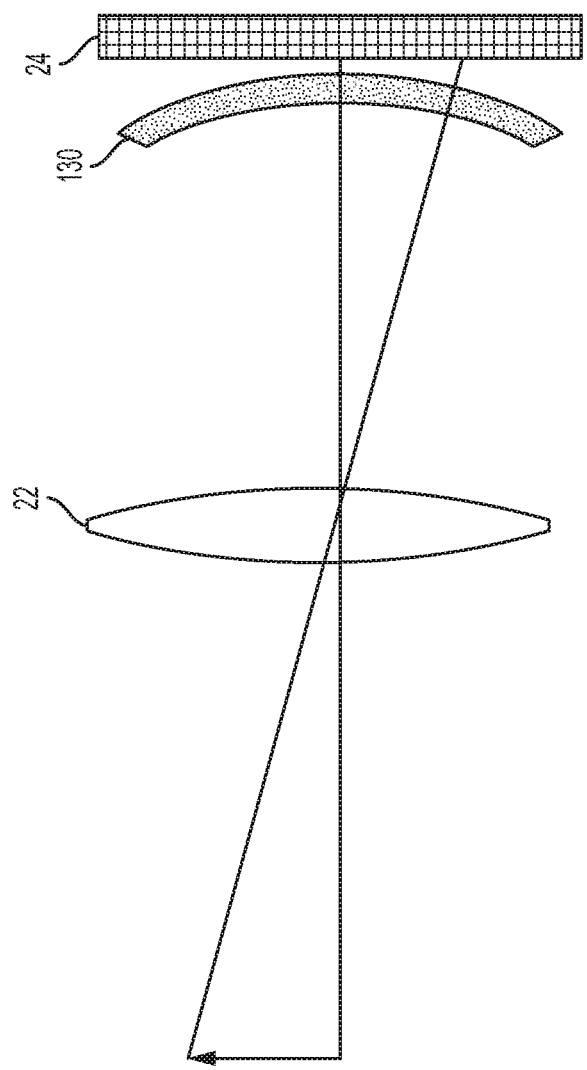
FIG. 19 shows an embodiment of a portion of an imaging system having a curved liquid crystal variable retarder.

Another embodiment involves the use of an LC cell that has uniform thickness but is not itself flat. For wide field of view imaging systems, the central ray of a given field point may enter the hyperspectral monitor at a very oblique angle, as shown in FIG. 19. Light entering the imaging optics 22 comes in at an oblique angle. By curving the LC cell 130 prior to linear sensor 2, the central ray of a given point in the field of view is normally incident on the liquid crystal cell no matter the field point.

As discussed previously, advantages may exist in illuminating the linear sensor with a monochromatic light source or calibration light source, such as that provided by the laser diode 20 in FIG. 3. The system in FIG. 20 allows full illumination of the linear sensor through the same geometric path that the image light takes without occluding the image light. It makes use of a polarizing beam splitter such as 144 instead of the first polarizer of the system. In this embodiment, the laser light from the laser diode 20 through the laser optics 142 would have the vertical (V) polarization entering the polarizing beam splitter through one port and the image light from the scene 140 through the imaging optics 22 would have the horizontal (H) polarization entering the polarizing beam splitter though the second port. The liquid crystal cell rubbing direction would be nominally 45 degrees between the two polarization directions, with the analyzer aligned with either the H or V polarization direction. Optionally, using two linear sensors 150 and 164, through two analyzers or output polarizers 148 and 162, and two LC variable retarders 146 and 160, would allow capture of the other polarization of light, nominally increasing the light throughput by 100 percent. This two linear sensor embodiment would be advantageous even in the absence of a calibration light source.

Figure 20:
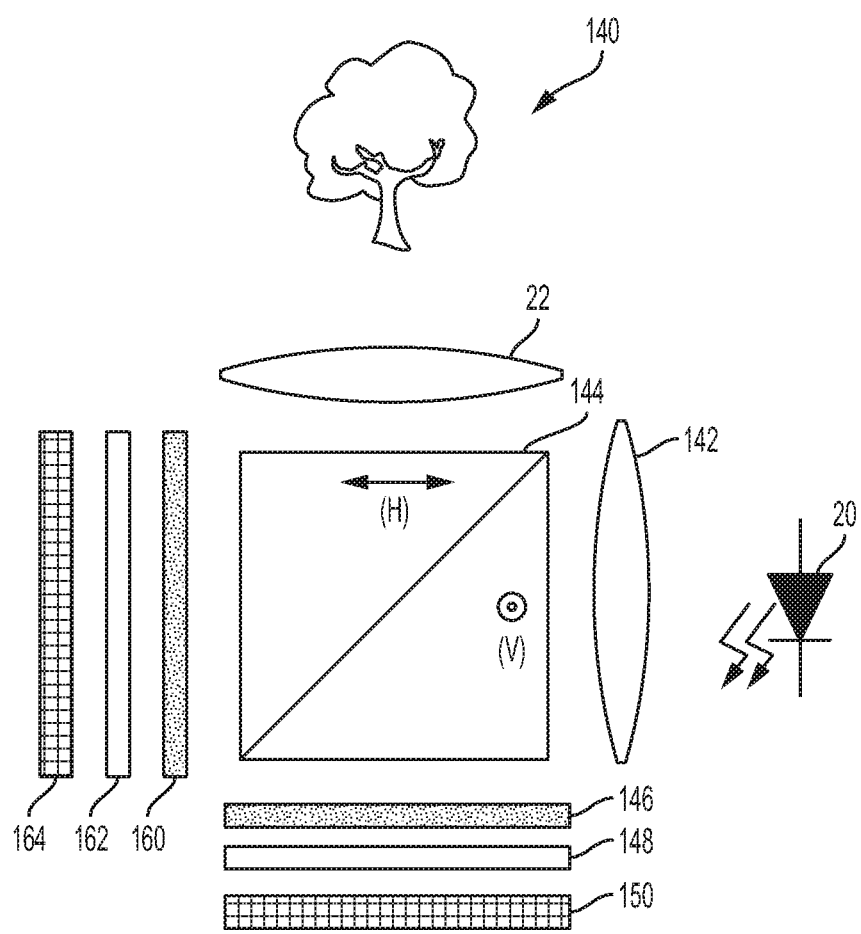
FIG. 20 shows an embodiment of a hyperspectral imaging monitor using a polarizing beam splitter to couple in a calibration light source.
Figure 21:
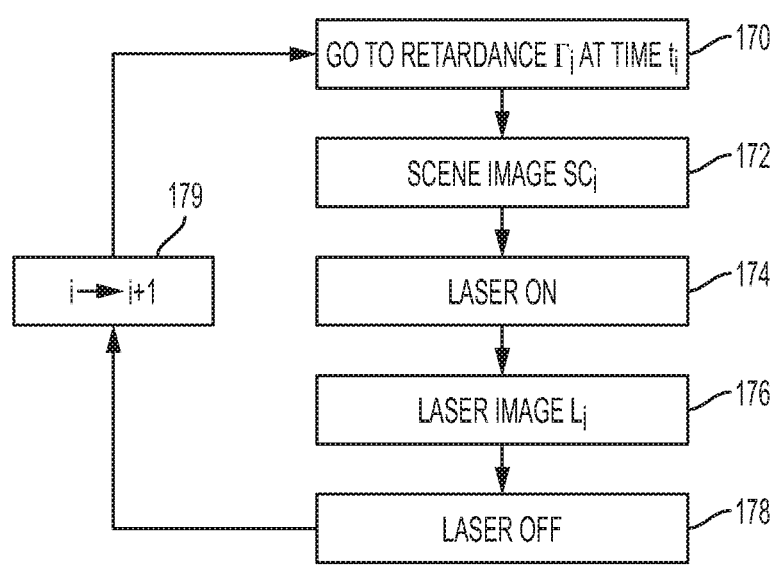
FIG. 21 shows a flowchart of an embodiment of a method of performing an imaging sequence with a calibration light source across a full field of view.

The illumination geometry in FIG. 20 would allow for the retardance to be measured at each point across the full field of view. This information could allow for real-time, closed-loop control as discussed above, or in the analysis of the images to generate the hyperspectral image data. This arrangement would allow the system to interleave frames of image data with frames of light from the monochromatic image source to measure the retardance at each point in time and space. The exposure time used to sample the light source could be reduced if the power of the light source were raised. FIG. 21 shows an embodiment of such a method.

In FIG. 21, the system sets the retardance at retardance $\Gamma_i$, at time $t_i$ at 170. The scene $SC_i$ is then captured at 172 to result in one frame of image data. The laser is then turned on at 174, and the image of the laser light is then captured as laser image $L_i$ at 176. The laser is then turned off at 178 and the process repeats at the next settings at 179. In this manner, the system captures the retardance at multiple points in the field of view at many different times to allow for adjustment in the operation of the system, or adjustment in the processing of the data, etc.

Yet another modification involves the control of the liquid crystal variable retarder. As dynamic control of the liquid crystal material can be problematic, it may be advantageous to drive the retarder adiabatically but in a way that allows controlled changes in retardance much faster than the retarder's passive relaxation time. This can be done by significantly decreasing the relaxation or response time of the retarder through the proper choice of voltage waveforms. The response time of the liquid crystal variable retarder can be made very short if the driving voltages are high enough. Therefore it may be useful to drive the liquid crystal variable retarder with a two-component electric field.

Figure 22:
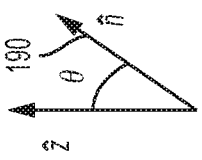
FIG. 22 shows a diagram of a two-component electric field.
Figure 22:
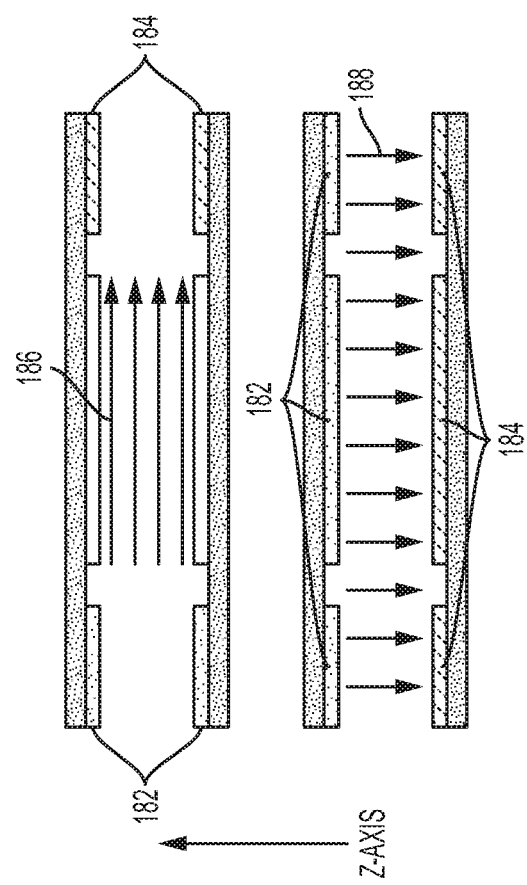

As used here, a two-component field has a first component, or a perpendicular component, which causes the liquid crystal material to align perpendicular to the cell's layers and a second component, or a parallel component that causes the liquid crystal to align parallel with the cells' layers. These components can be generated, for example, by combinations of electrode driving potentials to create perpendicular and parallel electric fields, as in FIG. 22, and combinations of driving frequencies that create positive and negative dielectric anisotropies. The parallel field 186 in FIG. 22 may result from positive voltages being placed on electrodes 182 and negative voltage on electrodes 184. The perpendicular field 188 may result from the positive voltages being placed on electrodes 182 in the bottom diagram and negative voltages being place on the electrodes 184. The perpendicular component may then be a perpendicular electric field at a frequency $f_1$ with a positive dielectric anisotropy or a parallel field at a frequency $f_2$ with a negative dielectric anisotropy. The parallel component may then be a parallel field at frequency $f_1$ with positive dielectric anisotropy or a perpendicular field at frequency $f_2$ with a negative dielectric anisotropy.

If only a parallel (or perpendicular) electrical field were used, then the first component $E_A$ would be the field amplitude at frequency $f_1$ ($f_2$), and the second component $E_B$ would be the field amplitude at frequency $f_2$ ($f_1$). Alternatively, one can use only frequency $f_1$ (or only frequency $f_2$) for the electric field. In this case, component $E_A$ would be the parallel (or perpendicular) field and component $E_B$ would be the perpendicular (or parallel) field. The liquid crystal director orientation 190 will adiabatically track the angle theta ($\Theta$) given by $\arctan(E_A/E_B)$, and the relaxation time to this angle is given by $\tau = (E^2_C/(E^2_A + E^2_B))t_{relax}$, where $t_{relax}$ is the passive (field-off) relaxation time of the liquid crystal cell and $E_C$ is the critical field response to create a finite distortion at the mid-point of the cell. Orientation changes of the LC director can be made arbitrarily fast by ensuring the relaxation time .tau. is much faster than any time between orientation changes of the liquid crystal director. This can be accomplished by making the field components $E_A$ and $E_B$ large enough, but with the correct ratio to reach the desired liquid crystal director orientation and hence the desired retardance of the liquid crystal variable retarder. More generally, one component of a two component field can apply positive torque to rotate the liquid crystal molecules within a cell of the liquid crystal variable retarder to increase the retardance of that cell, and the other component can apply negative torque to decrease the retardance. Simultaneous application of both components causes the liquid crystal molecules to come to equilibrium at an angle set by the ratio of the components, at a rate determined by the magnitude of the components. Thus, a two-component field in principle allows arbitrary control of the director of the liquid crystal molecules and hence arbitrary control of the retardance of a liquid crystal variable retarder.

Other considerations with regard to faster drive times lie in the selection of the liquid crystal material itself. Ferroelectric liquid crystals or polymer network liquid crystals have faster response times. A polymer network liquid crystal material has liquid crystal material embedded with a polymer network.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A hyperspectral imaging system, comprising:
 a first light source outputting first light configured to illuminate an image bearing surface;
 an input polarizer disposed within a device housing including an aperture arranged to receive and polarize the first light illuminating the image bearing surface and received via the aperture;
 a liquid crystal variable retarder disposed within the device housing and arranged after the input polarizer along a path of the first light to change a polarization of the first light in a wavelength-dependent manner;
 an output polarizer disposed within the device housing and arranged to receive the wavelength-dependent polarized first light and to convert polarization state information of the first light into a form detectable as light intensity;
 a voltage source electrically connected to the liquid crystal variable retarder;
 a controller connected to the voltage source, the controller configured to control voltages applied to the liquid crystal variable retarder to control a retardance of the first light;
 a linear image sensor disposed within the device housing and having a length extending in a direction to obtain images of the first light, the linear image sensor synchronized with the controller to collect the images as a function of retardance of the liquid crystal variable retarder after the first light passes through the output polarizer, for generation of an output signal corresponding to a portion of the linear image sensor; and
 an internal light source disposed within the device housing, which internal light source is separate and distinct from the first light source, arranged to output second light emitted from within the housing and directly towards the input polarizer and the linear image sensor such that second light emitted by the internal light source from within the housing is received by the linear image sensor.

2. The system of claim 1, wherein the linear sensor is a one-dimensional, sensor array.

3. The system of claim 1, wherein the linear sensor is a two-dimensional, sensor array having pixels binned together to form the linear sensor.

4. The system of claim 1, wherein the linear image sensor is a full width array sensor.

5. The system of claim 1, wherein the portion of the linear sensor corresponds to a single pixel.

6. The system of claim 1, wherein the portion of the linear sensor corresponds to a plurality of pixels binned together.

7. The system of claim 1, further comprising a processor programmed to perform a transform of the output signal to generate spectral information.

8. The system of claim 7, wherein the transform is a Fourier transform.

9. A printer, comprising:
I.) a first light source;
II.) an image bearing surface positioned to receive light from the first light source and to form output light from the light incident thereon, the image bearing surface disposed on a drum or a belt to move the image bearing surface in a process direction;
III.) a hyperspectral imaging system comprising:
an input polarizer disposed within a device housing including an aperture arranged to receive and polarize the output light received via the aperture;
a liquid crystal variable retarder disposed within the device housing and arranged after the input polarizer along a path of the output light to change polarization of the output light in a wavelength-dependent manner;
an output polarizer disposed within the device housing and arranged to receive the wavelength-dependent polarized output light and to convert polarization state information of the output light into a form detectable as light intensity;
a voltage source electrically connected to the liquid crystal variable retarder;
a controller connected to the voltage source, the controller configured to control voltages applied to the liquid crystal variable retarder to control a retardance of the output light;
a linear image sensor disposed within the device housing and having a length extending in a direction to obtain images of the output light in a cross-process direction, the linear image sensor synchronized with the controller to collect the images as a function of retardance of the liquid crystal variable retarder after the output light passes through the output polarizer, for generation of an output signal corresponding to a portion of the linear image sensor;
an internal light source disposed within the device housing, which internal light source is separate and distinct from the first light source, arranged to output internal light emitted from within the housing to directly illuminate the input polarizer and the linear image sensor such that internal light emitted by the internal light source from within the housing is received by the linear image sensor; and
IV.) a processor to perform transformations of the output signal into spectral information.

10. The printer of claim 9, wherein the linear sensor is a one-dimensional, sensor array.

11. The printer of claim 9, wherein the linear sensor is a two-dimensional, sensor array having pixels binned together to form the linear sensor.

12. The printer of claim 9, wherein the linear image sensor is a full width array sensor.

13. The printer of claim 9, wherein the image bearing surface is a photoreceptor.

14. The printer of claim 9, wherein the portion of the linear sensor corresponds to a single pixel.

15. The printer of claim 9, wherein the portion of the linear sensor corresponds to a plurality of pixels extending along the cross-process direction, the plurality of pixels being binned together.

16. The printer of claim 9, wherein the transform is a Fourier transform.

17. The printer of claim 9, wherein the image bearing surface is an output sheet of paper.

18. The printer of claim 9, wherein the image bearing surface is a photoreceptor belt.

19. The system of claim 1 further comprising:
a photodetector, which photodetector is separate and distinct from the linear image sensor, arranged to obtain first light illuminating the image bearing surface and received via the aperture.

20. The printer of claim 9 further comprising:
a photodetector, which photodetector is separate and distinct from the linear image sensor, arranged to obtain output light received via the aperture.

21. The system of claim 19, wherein the photodetector is arranged to obtain second light emitted by the internal light source.

22. The printer of claim 20, wherein the photodetector is arranged to obtain internal light emitted by the internal light source.

\* \* \* \* \*